US010650460B2

(12) United States Patent
Bostic et al.

(10) Patent No.: US 10,650,460 B2
(45) Date of Patent: May 12, 2020

(54) SYSTEM TO ADMINISTER RISK TRANSFER AND PROPERTY SALVAGE RECOVERY

(71) Applicant: Hartford Fire Insurance Company, Hartford, CT (US)

(72) Inventors: Daniel Lee Bostic, Naugatuck, CT (US); Paul J. Edwards, West Hartford, CT (US); Andrew J Reed, Peoria, AZ (US); Michael Adam Scott, Carmel, IN (US); Keren Shemesh, West Haven, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 578 days.

(21) Appl. No.: 14/745,923

(22) Filed: Jun. 22, 2015

(65) Prior Publication Data

US 2016/0125546 A1 May 5, 2016

Related U.S. Application Data

(60) Provisional application No. 62/074,958, filed on Nov. 4, 2014.

(51) Int. Cl.
*G06Q 40/00* (2012.01)
*G06Q 40/08* (2012.01)

(52) U.S. Cl.
CPC .................................. *G06Q 40/08* (2013.01)

(58) Field of Classification Search
CPC .............................. G06Q 40/08; G06Q 40/00
See application file for complete search history.

(56) References Cited

U.S. PATENT DOCUMENTS

| 5,950,169 | A | 9/1999 | Borghesi et al. |
| 7,739,133 | B1* | 6/2010 | Hail ........................ G06Q 40/00 705/4 |
| 8,719,061 | B2 | 5/2014 | Birchall |
| 9,019,092 | B1* | 4/2015 | Brandmaier .......... B60R 25/102 340/426.1 |
| 2004/0030587 | A1* | 2/2004 | Danico .................. G06Q 40/02 705/4 |
| 2004/0111302 | A1* | 6/2004 | Falk ........................ G06Q 10/10 705/4 |
| 2005/0060207 | A1 | 3/2005 | Weidner et al. |
| 2007/0174094 | A1* | 7/2007 | Ramsey ............. G06Q 10/0635 705/4 |

(Continued)

*Primary Examiner* — Mike Anderson
(74) *Attorney, Agent, or Firm* — Howard IP Law Group, PC

(57) ABSTRACT

According to some embodiments, data may be received indicative of a plurality of insurance claims. A risk transfer opportunity platform processor may, based on the received data, identify an insurance claim as being associated with a potential risk transfer opportunity. For the identified insurance claim, the risk transfer opportunity platform processor may automatically arrange for a potential risk transfer user interface to be displayed to a claim handler and may receive, via the potential risk transfer user interface, recovery details from the claim handler, including an overall total damage value and a high and low risk transfer value. A summary report may then be automatically generated for a plurality of insurance claims based in part on the recovery details received from the claim handler, and an indication of the summary report may be transmitted.

21 Claims, 25 Drawing Sheets

(56) References Cited

U.S. PATENT DOCUMENTS

| | | | |
|---|---|---|---|
| 2007/0226072 A1* | 9/2007 | Gross | G06Q 30/02 705/4 |
| 2011/0082712 A1* | 4/2011 | Eberhardt, III | G06Q 10/10 705/4 |
| 2011/0276452 A1 | 11/2011 | Stephens | |
| 2012/0284052 A1* | 11/2012 | Saukas | G06Q 10/00 705/3 |
| 2014/0081652 A1* | 3/2014 | Klindworth | G06Q 10/10 705/2 |
| 2014/0156315 A1* | 6/2014 | Canovi | G06Q 40/08 705/4 |
| 2014/0344131 A1 | 11/2014 | Sloan, III | |

* cited by examiner

LOSS DETAILS

DESCRIPTION: CLAIMANT SLIPPED AND FELL
OUTSIDE INSURED BUILDING

PROPERTY

CLAIM TYPE: PREMISES

LOSS TYPE: SLIP

LOSS DATE: 02/10/2018

WITNESSES: NO

POLICY STATE: FLORIDA

PLANNED ACTIVITIES — 710

| DUE | PRIORITY | SUBJECT | ASSIGNED TO | |
|---|---|---|---|---|
| 03/26/2018 | URGENT | INITIAL CONTACT WITH INSURED | CH_101 | |
| | NORMAL | OBTAIN PHOTOS AND VIDEOS | CH_101 | |
| | NORMAL | REVIEW FOR RISK TRANSFER | CH_101 | YES |

FIG. 7

RISK TRANSFER – GENERAL INFORMATION

RISK TRANSFER STATUS: OPEN

PARTIES OF INTEREST

810

| NAME | TYPE | LIABILITY % | RISK TRANSFER TYPE | OTHER COVERAGE | RELATED TO |
|---|---|---|---|---|---|
| BUILDING MANAGEMENT | ADDITIONAL INSURED | 20% | OUTBOUND | ADDITIONAL INSURED | (1) 3RD PARTY BODILY INJURY |
| CONSTRUCTION CO. | CONTRACTOR | 50% | OUTBOUND | CONTRACTUAL OBLIGATION | (1) 3RD PARTY BODILY INJURY |

FIG. 8

INSURANCE CLAIM PROCESSING SYSTEM

INSURANCE CLAIM PROCESSING SYSTEM: RISK TRANSFER – GENERAL INFORMATION

RISK TRANSFER – GENERAL INFORMATION

RISK TRANSFER STATUS: OPEN

PARTIES OF INTEREST
— 910

| NAME | TYPE | LIABILITY % | RISK TRANSFER TYPE | OTHER COVERAGE | RELATED TO |
|---|---|---|---|---|---|
| BUILDING MANAGEMENT | ADDITIONAL INSURED | 20% | OUTBOUND | ADDITIONAL INSURED | (1) 3RD PARTY BODILY INJURY |
| CONSTRUCTION CO. | CONTRACTOR | 50% | OUTBOUND | CONTRACTUAL OBLIGATION | (1) 3RD PARTY BODILY INJURY |

— 920

RISK TRANSFER STRATEGY

UPDATED STRATEGY – THE INSURED HIRED CONSTRUCTION CO. TO REPAIR A SIDEWALK OUTSIDE OF THE ENTRANCE TO INSURED'S BUILDING. THE REPAIR WORK STARTED ON FEB. 7, 2018 AND HAS AN EXPECTED DATE OF COMPLETION OF MARCH 7, 2014. THE CLAIMANT TRIPPED AND FELL OVER A PORTION OF SIDEWALK BEING REPAIRED. RECEIVED A COPY OF THE CONTRACT BETWEEN THE INSURED AND CONSTRUCTION CO. THE CONTRACT INCLUDES INDEMNIFICATION AND HOLD HARMLESS LANGUAGE. A SURVEILLANCE VIDEO CONFIRMS THE CLAIMANT TRIPPED AND FELL OVER AN UNEVEN PORTION OF THE SIDEWALK. CAUTION SIGNS IN PLACE.

*FIG. 9*

RISK TRANSFER – DETAILS

| NAME | TYPE | LIABILITY % | RISK TRANSFER TYPE | OTHER COVERAGE | RELATED TO |
|---|---|---|---|---|---|
| BUILDING MANAGEMENT | ADDITIONAL INSURED | 20% | OUTBOUND | ADDITIONAL INSURED | (1) 3RD PARTY BODILY INJURY |
| CONSTRUCTION CO. | CONTRACTOR | 50% | OUTBOUND | CONTRACTUAL OBLIGATION | (1) 3RD PARTY BODILY INJURY |

WORKSHEET FOR: CONSTRUCTION CO. — 1110

PARTY OF INTEREST
NAME: CONSTRUCTION CO.
TYPE: CONTRACTOR
CARRIER: XYZ INSURANCE CO.
CONTACT: MS. JONES
POLICY #: P_123456INS
CLAIM #: C_10010

| RISK TRANSFER EVALUATION | LOW | HIGH |
|---|---|---|
| TOTAL DAMAGES | $10,000.00 | $20,000.00 |
| RISK TRANSFER % | 10% | 15% |
| RISK TRANSFER OFFSET | $1,000.00 | $3,000.00 |
| EST DAMAGES VALUE | $9,000.00 | $17,000.00 |
| FINANCIALS | RESERVED | PAID |
| INDEMNITY | $10,000.00 | - |
| EXPENSE | $2,000.00 | - |

— 1120

RISK TRANSFER LINES:

| DATE | STATUS | ESTIMATE DAMAGE VALUE | RISK TRANSFER % |
|---|---|---|---|
| 02/14/2018 | REQUESTED | $17,000.00 | 15% |
| 02/28/2018 | PENDING | $17,000.00 | 15% |

COMMENTS — 1130
ISSUED TENDER TO CONSTRUCTION CO. AND THEIR INSURANCE CARRIER XYZ INSURANCE CO.
RECEIVED A CALL FROM MS. JONES (CLAIM HANDLER FOR XYX); INVESTIGATION PENDING

*FIG. 11*

INSURANCE CLAIM PROCESSING SYSTEM

INSURANCE CLAIM PROCESSING SYSTEM: SALVAGE RECOVERY DETAILS

RECOVERY CATEGORY [SALVAGE ▽] — 1410

PAYOR [NORTH CAROLINA ADVANCED ENERGY ▽] — 1420

EXPOSURE:  ☐ (1) 1ST PARTY BUILDING – NORTH CAROLINA ADVANCED ENERGY
☐ (2) 1ST PARTY EQUIPMENT BREAKDOWN – NORTH CAROLINA ADVANCED ENERGY

CHECK NUMBER [1234]
CHECK AMOUNT [50.00]     — 1430
CHECK DATE [06/18/2018]

SALVAGE RECOVERY DETAILS

| RESERVE LINE | RECOVERY RESERVE | GROSS SETTLEMENT |
|---|---|---|
| ☐ (2) 1ST PARTY EQUIPMENT BREAKDOWN – NORTH CAROLINA ADVANCED ENERGY; INDEMNITY/EQUIPMENT BREAKDOWN – HSB OTHER THAN SPECTRUM - BPP | $150 | $25.00 |
| ☐ (2) 1ST PARTY EQUIPMENT BREAKDOWN – NORTH CAROLINA ADVANCED ENERGY; INDEMNITY/EQUIPMENT BREAKDOWN – HSB OTHER THAN SPECTRUM - BPP | $150 | $25.00 |
|  |  | $50.00 |

INSURANCE CLAIM PROCESSING SYSTEM

1500

INSURANCE CLAIM PROCESSING SYSTEM: SALVAGE FOR PROPERTY – LOSS DETAILS

WHAT HAPPENED? | ENTER DETAILS ABOUT THE EVENT AND/OR PROPERTY HERE

LOSS DATE | 05/07/2018

LOSS CAUSE | OIL HEATING

FAULT RATING | <NONE SELECTED>

CATASTROPHE | <NONE SELECTED>

WEATHER RELATED? ☐ YES ☐ NO

SALVAGE PRESENT? ☐ YES ☐ NO

— 1510

DAMAGE TYPE
☐ BURGLARY/THEFT/MYSTERY
☐ FIRE
☐ HAIL
☐ IDENTITY THEFT
☐ LOSS ASSESSMENT
☐ WATER
☐ WIND

— 1530

LOSS LOCATION
☐ PRIMARY LOCATION
  123 MAIN STREET
  HARTFORD, CT

☐ OTHER LOCATION

— 1540

LOSS ITEMS
PERSONAL PROPERTY - LAPTOP

SALVAGE DETAILS

FILTER BY: [(1) BUILDING – MR. JONES ▽]

SALVAGE STATUS: OPEN
SALVAGE SPECIALIST NAME: MR. JONES
DATE OF REFERRAL: 06/01/2018

SALVAGE CATEGORIES

| CATEGORY | RESERVE LINE | SALVAGE ITEM | ESTIMATED SALVAGE AMOUNT | STATUS | OWNER RETAINED | ACTUAL SALVAGE | TOTAL EXPENSES | RECVRD TOTAL |
|---|---|---|---|---|---|---|---|---|
| XXX | XXXX | BUILDING | 2000 | CLOSED | NO | 1800 | 300 | 1500 |
| XXX | XXXX | INVENTORY | 500 | NA | YES | NA | NA | NA |
| XXX | XXXX | INVENTORY | 100 | OPEN | NO | XXX | XXX | XXX |

SALVAGE VENDOR DETAILS

| VENDER NAME | DATE REFERRED TO VENDOR | DATE ITEM RECEIVED FROM VENDOR | SELL DATE | VENDOR COMMISSION | OTHER EXPENSES |
|---|---|---|---|---|---|
| VENDOR NAME | XX/XX/XXXX | XX/XX/XXXX | XX/XX/XXXX | 200 | 100 |

FIG. 16

LOSS DETAILS

DESCRIPTION: CLAIMANT SLIPPED AND FELL OUTSIDE INSURED'S BUILDING

PROPERTY
123 PACIFIC STREET, FLORIDA

CLAIM TYPE: PREMISES

LOSS TYPE: SLIP

LOSS DATE: 02/10/2018

IS ANYONE ELSE POTENTIAL LIABLE  YES
FOR THIS LOSS?   ⌐ 2410

WITNESSES: NO

POLICY STATE: FLORIDA

FIG. 24

SYSTEM TO ADMINISTER RISK TRANSFER AND PROPERTY SALVAGE RECOVERY

CROSS-REFERENCE TO RELATED APPLICATION

The present invention claims the benefit of U.S. Patent Application No. 62/074,958 filed Nov. 4, 2014 and entitled "SYSTEM TO ADMINISTER RISK TRANSFER AND SALVAGE RECOVERY." The entire content of that application is incorporated herein by reference.

FIELD

The present invention relates to computer systems and more particularly to computer systems that provide an automated insurance claim processing system.

BACKGROUND

An insurer may provide payments when claims are made in connection with an insurance policy. For example, an employee who is injured while working might receive payments associated with a workers' compensation insurance policy purchased by his or her employer. The insurer may assign a claim handler to communicate with a claimant, an employer, another insurer, and/or medical service providers to help determine the appropriate amount of payment.

In some cases, an insurer may have an opportunity to recover some or all of the payments made in connection with an insurance claim. Consider, for example, an insurance claim associated with a claimant who fell while walking on a sidewalk. In this case, another insurer associated with a construction company that was working on the sidewalk when the injury occurred may be responsible for some or all of the claimant's injury. In the case of a property insurance claim, as another example, a damaged piece of property may still have some salvage value that may be recovered by the insurer. Typically, a claim handler working for an insurer will manually review an insurance claim to determine if any recovery opportunities exist. However, manually determining if recovery opportunities exist can be a time consuming and error prone task, especially when there are a substantial number of claims, of many different types and/or from many different locations, to be processed. For example, an insurer might receive tens of thousands of new insurance claims each year (which might represent a substantial number of potential recovery opportunities to be uncovered and processed). It would therefore be desirable to provide systems and methods to facilitate the detection and/or processing of recovery opportunities in an automated, efficient, and accurate manner.

SUMMARY

According to some embodiments, systems, methods, apparatus, computer program code and means may facilitate the detection and/or processing of recovery opportunities. In some embodiments, data may be received indicative of a plurality of insurance claims. A recovery opportunity platform processor may, based on the received data, identify an insurance claim as being associated with a potential recovery opportunity. For the identified insurance claim, the recovery opportunity platform processor may automatically arrange for a potential recovery user interface to be displayed to a claim handler and may receive, via the potential recovery user interface, recovery details from the claim handler. A summary report may be automatically generated for a plurality of insurance claims based in part on the recovery details received from the claim handler, and an indication of the summary report may be transmitted.

A technical effect of some embodiments of the invention is an improved and computerized method to facilitate the detection and/or processing of recovery opportunities. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 6 through 11 illustrate risk transfer recovery opportunity displays in accordance with some embodiments.

FIGS. 14 through 16 illustrate property salvage recovery opportunity displays in accordance with some embodiments.

FIG. 24 illustrates a tablet computer displaying information about a recovery opportunity in accordance with some embodiments.

DETAILED DESCRIPTION

An insurer may provide payments when claims are made in connection with insurance policies. Note that some embodiments may be associated with an insurance claim process system that is able to process different types of insurance, including workers' compensation insurance, automobile insurance, long term disability insurance, short term disability insurance, flexible combinations of short and long term disability insurance, homeowners insurance, property insurance, general liability insurance, commercial insurance, and/or personal insurance. Note that embodiments described here might be associated with other types of insurance, including vehicle insurance, casualty insurance, etc.

Figure 1:
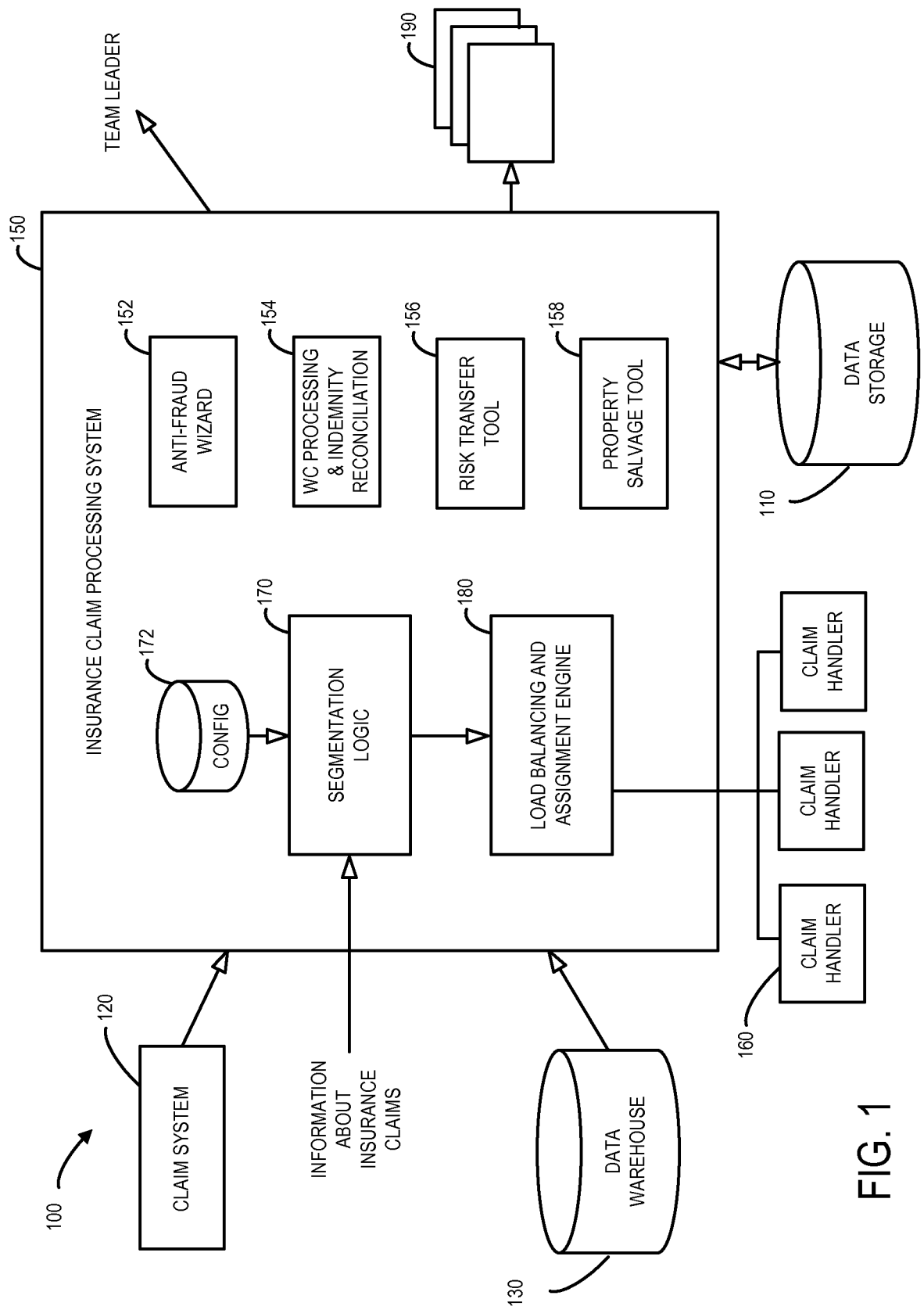
FIG. 1 is block diagram of a system according to some embodiments of the present invention.

Manually detecting and/or processing potential recovery opportunities for insurance claims can be a time consuming and difficult task, especially when there are a substantial number of claims, of many different types and/or from many different locations, to be processed. It would therefore be desirable to provide systems and methods to facilitate the detection and processing of recovery opportunities for insurance claims. FIG. 1 is block diagram of a system 100 according to some embodiments of the present invention. In particular, the system 100 includes an insurance claim processing system 150 that receives information about insurance claims (e.g., by receiving an electronic file from a team leader, an employer, an employee, an insurance agent, a medical service provider, or a data storage unit 110). According to some embodiments, incoming telephone calls and/or documents from a doctor may be used to create information in a claim system 120 which, in turn, can provide information to the insurance claim processing system 150. In other embodiments, the insurance claim processing system 150 may retrieve information from a data warehouse 130 (e.g., when the insurance claim processing system 150 is associated with an automobile insurance system, some information may be copied from an automobile insurance data warehouse). In other embodiments, some or all of the information about an insurance claim may be received via a claim submission process.

The insurance claim processing system 150 may, according to some embodiments, include segmentation logic 170 that automatically determines an appropriate segment (e.g., based on the likely complexity or liability) for insurance claims (e.g., in accordance with customizable configurations parameters 172). This segmentation information may then be used by a load balancing and assignment engine 180 to select an appropriate claim handler 160 for each insurance claim. According to some embodiments, historical information may be used to generate appropriate segmentation and/or claim assignment rules to be applied based on the specific facts of the insurance claim being processed.

The insurance claim processing system 150 might be, for example, associated with a Personal Computers (PC), laptop computer, an enterprise server, a server farm, and/or a database or similar storage devices. The insurance claim processing system 150 may, according to some embodiments, be associated with an insurance provider.

According to some embodiments, an "automated" insurance claim processing system 150 may facilitate the assignment of insurance claims to appropriate segments and/or claim handlers 160. For example, the insurance claim processing system 150 may automatically output a recommended claim segment for a received insurance claim (e.g., indicating that the insurance claim belongs in a "high exposure" segment) which may then be used to facilitate assignment of a claim handler 160. As used herein, the term "automated" may refer to, for example, actions that can be performed with little (or no) intervention by a human. Moreover, any of the embodiments described herein may be "dynamically" performed by monitoring parameters and/or automatically updating outputs in substantially real time.

As used herein, devices, including those associated with the insurance claim processing system 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The insurance claim processing system 150 may store information into and/or retrieve information from the data storage 110. The data storage 110 might be associated with, for example, a client, an employer, or insurance policy and might store data associated with past and current insurance claims and/or payments. The data storage 110 may be locally stored or reside remote from the insurance claim insurance claim processing system 150. As will be described further below, the data storage 110 may be used by the insurance claim processing system 150 to generate predictive models. According to some embodiments, the insurance claim processing system 150 communicates a recommended claim processing workflow (e.g., expedited or normal workflows), such as by transmitting an electronic file to a claim handler 160, a client device, an insurance agent or analyst platform, an email server, a workflow management system, a payment facilitation device (e.g., to send checks to claimants), etc. In other embodiments, the insurance claim processing system 150 might output a recommended claim workflow indication to a team leader who might select a claim handler based on that indication or override the indication based on other factors associated with the insurance claim.

According to some embodiments, the insurance claim processing system 150 further includes an anti-fraud wizard 152 (e.g., to help detect inappropriate insurance claims), a Workers' Compensation ("WC") processing and indemnity reconciliation tool 154 (e.g., to help a claim handler 160 comply with various jurisdiction based regulations), a risk transfer tool 156 (e.g., to help identify other parties who may have liability in connection with an insurance claim), and/or a property salvage tool 158 (e.g., to help identify situations where value may be identified and/or obtained in connection with an insurance claim). Moreover, the insurance claim processing system 150 may transmit information to other devices 190 or applications, such as email servers, report generators, calendar applications, etc. Note that at least some of the tools and other applications associated with the insurance claim processing system 150 might be incorporated within, or utilize, an electronic spreadsheet, such as the EXCEL® electronic spreadsheet program available from MICROSOFT®.

Although a single insurance claim processing system 150 is shown in FIG. 1, any number of such devices may be included. Moreover, various devices described herein might be combined according to embodiments of the present invention. For example, in some embodiments, the claim insurance claim processing system 150 and data storage 110 might be co-located and/or may comprise a single apparatus.

Figure 2:
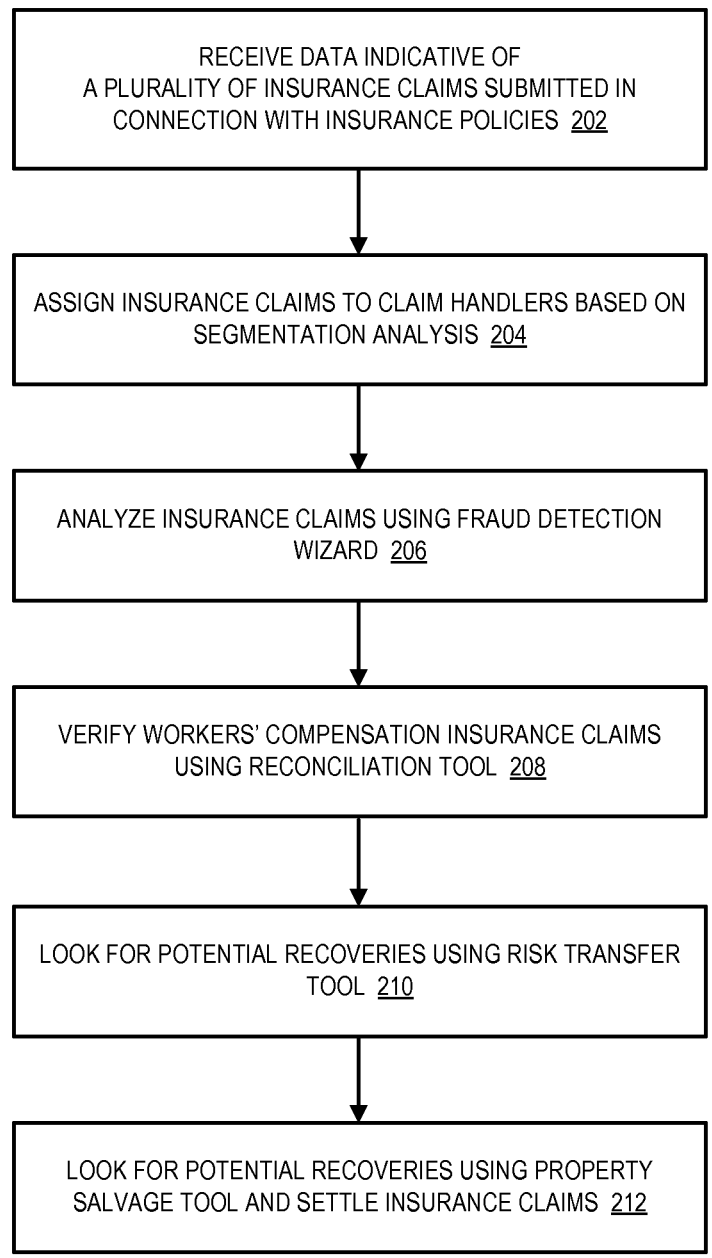
FIG. 2 illustrates a method that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, data may be received indicative of a plurality of insurance claims submitted in connection with insurance policies. The insurance claims might be associated with, for example, property insurance claims and/or commercial claims. Note that the data indicative of insurance claims might be received via submitted paper claims, a telephone call center, and/or an online claim submission web site.

At 204, insurance claims may be assigned to claim handlers based, at least in part, on a segmentation analysis. For example, an insurance claim might be recognized as requiring highly complex handling (e.g., a claim identified as a "longshore" claim) and thus be assigned to a "specialized" segment. As a result, the claim may be assigned to a particular group of claim handlers who have experience with these types of insurance claims.

At 206, insurance claims may be analyzed using a fraud detection wizard. The fraud detection wizard may, for example, look for suspicious information, patterns, or values within one or more insurance claims (which, when found, may prompt further investigation. At 208, workers' compensation insurance claims may be verified using a reconciliation tool. For example, different jurisdictions may have different recordkeeping requirement and/or penalties associated with workers' compensation claims and the reconciliation tool may help claim handlers process such claims in an appropriate manner. At 210, embodiments may look for potential recoveries using a risk transfer tool. According to some embodiments, the risk transfer tool might identify other parties (e.g., other insurance companies, employers, etc. who might be liable for at least a portion of the payments associated with an insurance claim). At 212, embodiments may look for potential recoveries using a salvage tool (e.g., the salvage value associated with a property loss) and the insurance claims may be settled.

Figure 3:
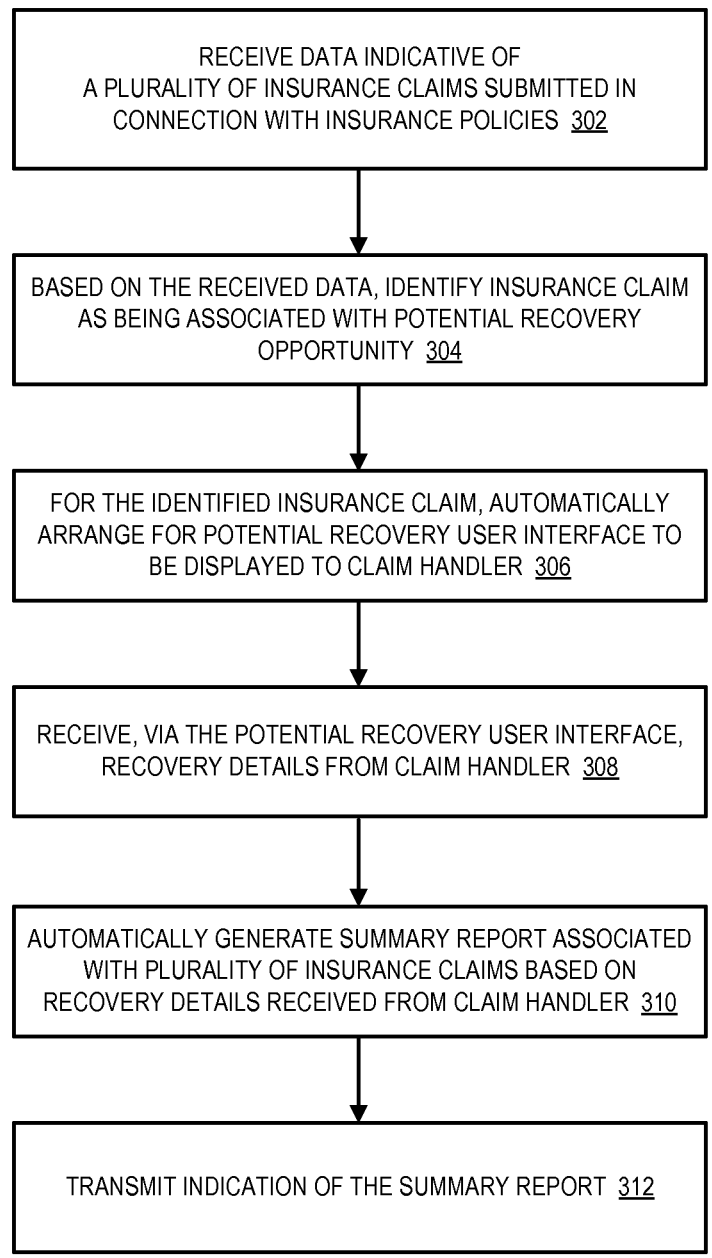
FIG. 3 is an example of a method that might be performed according to some embodiments.

Note that 210 and 212 are both associated with a search for potential recovery opportunities in connection with insurance claims. FIG. 3 is an example of a recovery opportunity method that might be performed according to some embodiments. At 302, data indicative of a plurality of insurance claims, submitted in connection with insurance policies, may be received. Based on the received data, an insurance claim may be identified at 304 as being associated with a potential recovery opportunity. The identification of the insurance claim might, for example, be an automatic process using a predictive model, a process that uses business rules and logic, and/or might be based at least in part on information received from a claim handler. For the identified insurance claim, it may be automatically arranged for a potential recovery user interface to be displayed to a claim handler at 306. At 308, recovery details may then be received from the claim handler via the potential recovery user interface.

According to some embodiments, the recovery details may be associated with a risk transfer recovery opportunity. In this case, a risk transfer recovery opportunity platform might store, for each risk transfer recovery opportunity, at least one of: a responsible party, a role, a liability amount, a risk transfer type, other coverage data, and/or related information. The risk transfer recovery opportunity platform might also store a risk transfer strategy and/or a set of planned activities, each including: a date due, a priority, a subject, and/or an assigned party to perform the planned activity. Moreover, the risk transfer recovery opportunity platform might further store a responsible party name, an insurance carrier, contact information, an insurance policy identifier, and/or a claim identifier along with a recovery monetary value and/or a recovery percentage.

According to some embodiments, the recovery details may be associated with a property salvage recovery opportunity. In this case, a property salvage recovery opportunity platform may store, for each property salvage recovery opportunity, at least one of: a salvage status, a salvage specialist identifier, a date of referral, a category, a salvage item, an estimate salvage amount, an owner retained indication, an amount paid for property, an actual salvage value, an expense total, and/or a recovered total value. According to some embodiments, the property salvage recovery opportunity platform may further automatically adjust a recovery reserve amount based on information received from a claim handler and/or a salvage specialist.

Referring again to FIG. 3, a summary report associated with a plurality of insurance claims, based in part on the recovery details received from the claim handler, may be automatically generated at 310. An indication of the summary report may then be transmitted at 312. The summary report may, for example, be transmitted to a team leader so that he or she can detect recovery trends, compare recovery productive among handlers or offices, etc. Similarly, an indication of a recovery amount (e.g., the total amount of recoveries identified by a particular claim handler) might be automatically transmitted to an email server, a workflow application, a report generator, a calendar application, and/or a payment facilitation device. According to some embodiments, the system may further arrange to track recovery payments received for the identified insurance claim.

Figure 4:
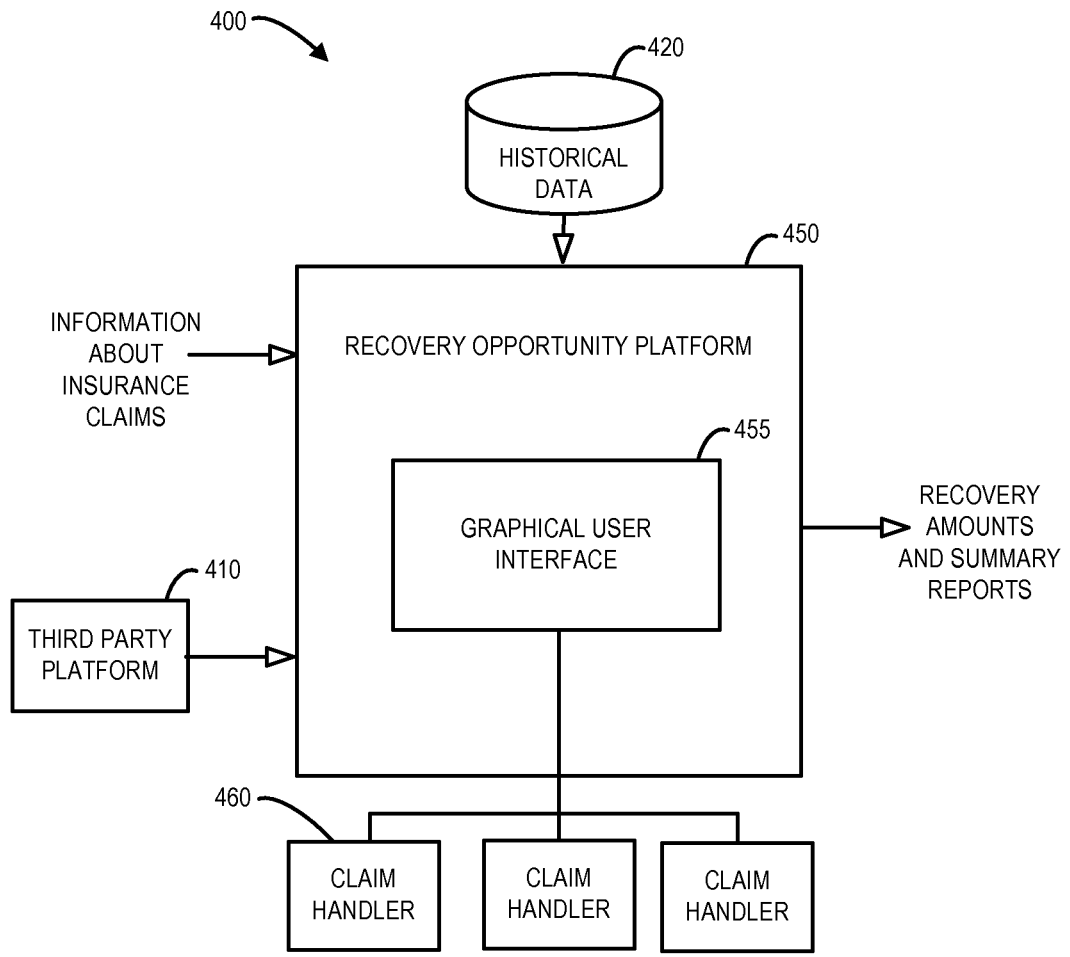
FIG. 4 is a block diagram of a recovery opportunity system in accordance with some embodiments.

FIG. 4 is block diagram of an insurance claim recovery opportunity system 400 according to some embodiments of the present invention. The recovery opportunity system 400 includes a recovery opportunity platform 450 which may be associated with the risk transfer tool 156 and/or property salvage tool 158 described with respect to FIG. 1. According to some embodiments, the recovery opportunity platform 450 automatically identifies potential risk transfer opportunities to claim handlers 460 and/or determines appropriate risk transfer amounts (e.g., based on information received from claim handlers 460 via a graphical user interface 455 and/or a third party platform 410) for insurance claims. The recovery amounts may also be used to create summary reports. According to some embodiments, historical data 420 may be used to train a predictive model that automatically identifies potential recovery opportunities.

Figure 5A:
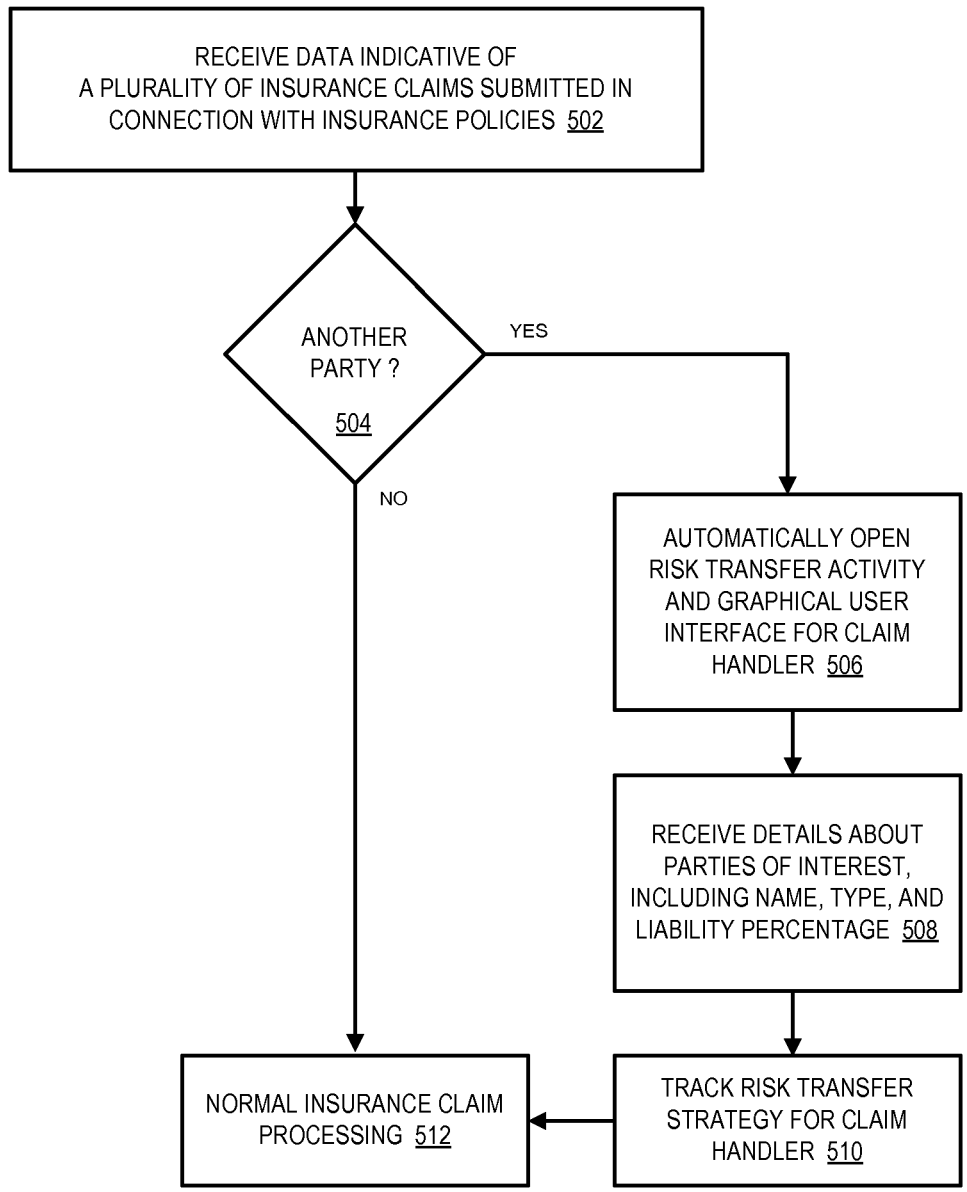
FIG. 5A is an example of a risk transfer recovery opportunity method that might be performed according to some embodiments.

FIG. 5A is an example of a risk transfer recovery opportunity method that might be performed by some or all of the elements of the system 400 described with respect to FIG. 4 according to some embodiments of the present invention. At 502, data may be received indicative of a plurality of insurance claims submitted in connection with insurance policies. Note that the data indicative of insurance claims might be received via submitted paper claims, a telephone call center, an online claim submission web page, etc. in connection with a First Notice Of Loss ("FNOL"). Although some embodiments are described with respect to a newly received insurance claim, note that any of the embodiments described herein may be performed in connection with an insurance claim currently being processed by a claim handler. For example, if information about the insurance claim changes (e.g., more information about another party who might be responsible for at least part of the claim becomes available), the system may dynamically and automatically adjust potential recovery indications and/or amounts associated with the claim.

At 504, it may be determined if there is another party potentially responsible for at least part of the insurance claim. According to some embodiments, this decision may be based on information received from a claim handler or may instead be based on a predictive model trained using historical data about insurance claims and prior risk transfer results. If there is not another party associated with the insurance claim at 504, normal insurance claim processing may be performed at 512. If there is another party associated with the insurance claim at 504, the system may automatically open a risk transfer activity and associated graphical user interface for the claim handler at 506. The graphical user interface may, for example, let the claim handler enter details about parties of interest, including a name, type of association with the claim, and a liability percentage at 508. The system may then track a risk transfer strategy for the claim handler at 510 (e.g., including notes and one or more activities that should be performed to pursue the risk transfer opportunity as appropriate), and normal insurance claim processing may be performed at 512. According to some embodiments, some or all of these steps may be automated and/or be associated with third party data or platforms. For example, a claims processing system might automatically retrieve a police report from a third party server and use a text mining process to help determine if another party might be responsible for some or all of the damages associated with an insurance claim.

Figure 5B:
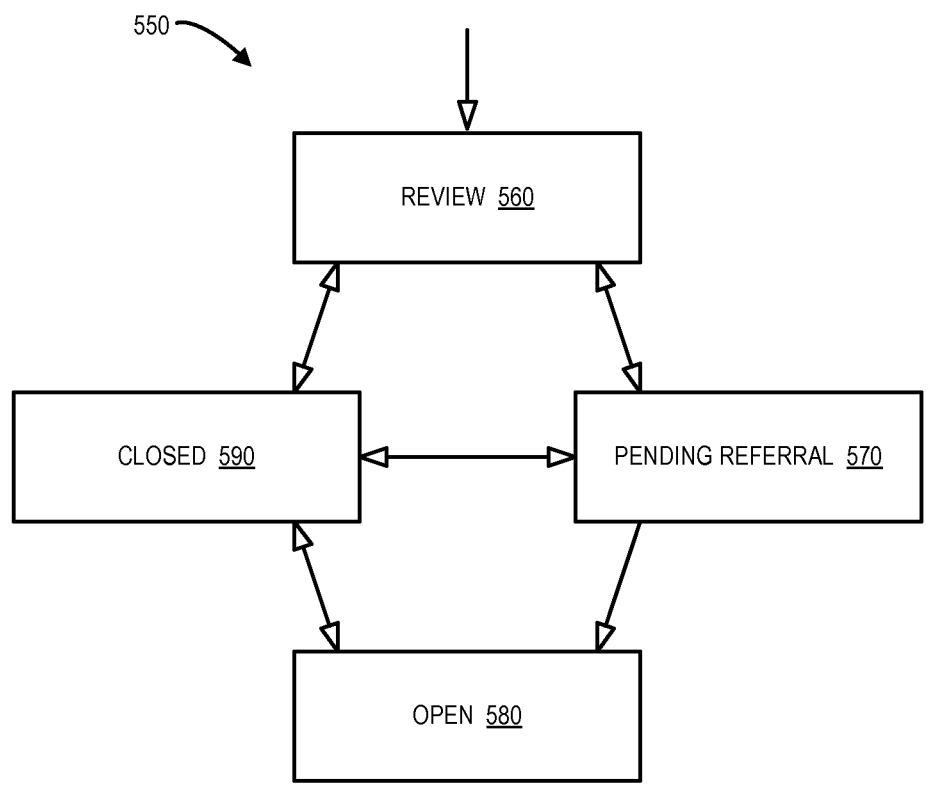
FIG. 5B illustrates transitions between subrogation statuses in accordance with some embodiments.

As used herein, the phrase "risk transfer" might refer to, for example, an investigation into the sharing of liability among multiple parties prior to a payment of a claim. Note that a risk transfer investigation may be similar to and share characteristics with a "subrogation" investigation into the sharing of liability among multiple parties after a payment of a claim has been made. FIG. 5B illustrates transitions 550 between subrogation statuses in accordance with some embodiments. In particular, the statuses include: review 560, pending referral 570, open 580, and closed 590. The review 560 status might indicate that a subrogation potential has been detected (but not yet confirmed). The pending referral 570 status might indicate that subrogation has been confirmed by handler (but exposure is still open). The open 580 status might indicate that subrogation has been confirmed by the handler, and that exposure closed. The closed 590 status might indicate that subrogation is closed due to various "closing reasons."

Note that different types of insurance may have different types of rules associated with the transfer between subrogation statuses. For example, an automobile insurance claim might enter the review 560 status based on automated subrogation detection rules that execute at the end of a First Notice of Loss ("FNOL") and any time a liability percentage or a Claim Description Code ("CDC") changes post FNOL. If the fault type is "comprehensive" for the claim, the system may look up a default segment from a CDC segmentation table. The table might indicate, for example, that subrogation may be indicated when a party is "struck against moving object" but not when a party is "struck by a falling object—weather related." Similarly, the status might transfer from review 560 to pending referral 570 when all of the following are entered: party name and address; insured field; insurer information; and liability accepted (yes, no, or uncertain). The status might transfer from pending referral 570 to open 580, for example, when exposure is closed.

The status might transfer from open 580 to closed 590, for example, when a subrogation outcome equals "paid in full." Other examples of subrogation outcomes include: arbitration lost, arbitration split decision, bankruptcy (no distribution), barred by contract, barred by statue, barred by statute of limitations, evidence discarded, insured at fault, insured signed a release, judgment entered, lack of documentation, not cost effective, responsible party deceased, responsible party has no assets, unable to locate, uncollectable, etc.

Subrogation decision might be based in part, according to some embodiments, based on state-by-state comparative negligence rule. In a "pure comparative" state, for example, the insured and the claimant can each recover the percentage fault of the other. For example, if the insured is 75% at fault and the claimant is 25% at fault, the outcome insured recovers 25% and the claimant can recover 75%. In a "modified comparative~49/51 type" state, at a 50/50 fault, both parties walk away and recover nothing from each other (any party 50% or more at fault is barred from recovery). If you are 49% at fault or less, you may recover the percentage fault attributed to the other party. For example, if the insured is 40% at fault and the claimant is 60% at fault, the insured may recover 60% of his or her damage from the other party. The other party is barred from recovery because he or she was 50% or more at fault. In a "modified comparative~50/50" state, at 50/50 fault, each party may recover 50% of his or her damages from the other party. If you are 51% at fault or more, you are barred from recovery. If you are 50% at fault or less, you may recover the percentage fault attributed to the other party. For example, if the insured is 55% at fault and the claimant is 45% at fault, the insured is barred from recovery because he or she is 51% or more at fault (and recover nothing). The claimant may recover 55% of his or her damages. A "contributory" state prevents a party from recovery if he or she contributed in any way to their damages. At 1% fault, you are barred from recovery. For example, if the insured is 10% at fault and the claimant is 90% at fault, the insured is barred from recovery because he or she contributed to his or her own damages. The claimant is barred from recovery as well. The only time a party has a right of recovery is if he or she is 0% at fault (in which case, he or she gets a 100% recovery). In a "slight v. gross contributory" state, the party who is the least at fault may recover all of his or her damages from the other party. For example, if the insured is 40% at fault and the claimant is 60% at fault, the insured may recover 100% of his or her damages and the claimant recovers nothing.

In the case of a workers' compensation insurance claim, subrogation categories might include: animal bite, assault, inhalation, ladder, motor vehicle, product & machinery, slip & fall, and struck by. The subrogation category and CDC field may then be used to automatically identify potential subrogation potential. In the case of a property insurance claim, the system may determine if any work was being performed in the area prior to the loss (and was the work performed by the insured, contractor, handyman, other, or unknown) and/or whether the loss was terrorism related. This information, along with the CDC field, may then be used to automatically identify potential subrogation potential.

Figure 6:
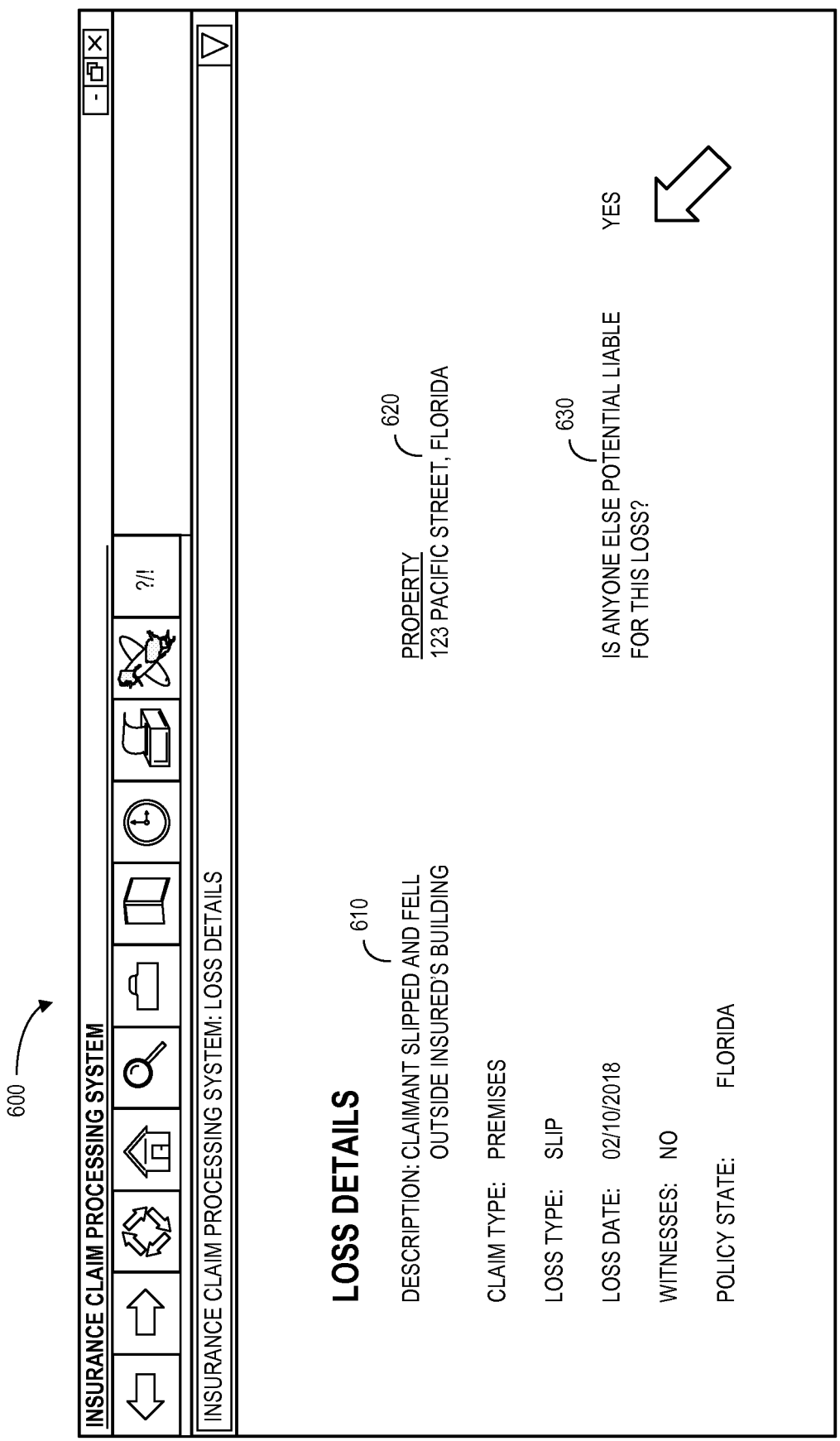

FIG. 6 illustrates risk transfer recovery opportunity display 600 in accordance with some embodiments. In particular, loss details 610 may include a description of the claim, a claim type, a loss type, a loss date, an indication of whether anyone witnessed the accident, and a policy state. The display 600 may further include a location of the property 620 where the loss occurred along with an indication of whether anyone else may be potentially liable for the loss 630. A positive indication that someone else may be potentially liable for the loss 630 (e.g., by the claim handler selecting "yes") may, according to some embodiments, result in the creation of a risk transfer opportunity for the insurance claim. For example, FIG. 7 illustrates a display 700 with a pop-up window that displays a set of planned activities 710 including an automatically created "review of risk transfer" activity having an appropriate due date, priority, and assigned claim handler. Some or all of the planned activities 710 might be, according to some embodiments, automatically performed and/or tracked by the claims processing system. For example, if an activity is not performed by a due date, an email server might automatically send one or more reminder messages and/or electronic file or record containing relevant information to a claim handler and/or the handler's manager or team leader.

Figure 10:
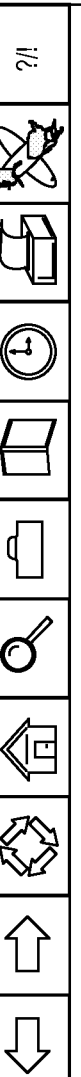

Note that more than one potential risk transfer opportunity may be associated with a single insurance claim. For example, FIG. 8 illustrates a general risk transfer information display 800 for an "open" risk transfer status having two parties of interest 810: "Building Management" and "Construction Co." For each party of interest 810, the display 800 may include a name, a type, a liability percentage, a risk transfer type (e.g., inbound or outbound), other coverages (e.g., none selected, additional insured, contractual obligations, statutory obligations, or other), and how the party is related to the insurance claim. According to some embodiments, the system may help a claim handler track a risk transfer strategy associated with the insurance claim. For example, FIG. 9 illustrates a risk transfer display 900 that includes, in addition to the parties of interest 910, a risk transfer strategy area 920 where a claim handler can update notes associated with the insurance claim. FIG. 10 illustrates a display 1000 wherein a history of risk transfer strategy notes 1010 are kept and displayed to the claim handler (e.g., along with a date and time when each risk transfer strategy note was created and/or updated).

FIG. 11 illustrates a more detailed display 1100 associated with the risk transfer platform. In particular, the display 1100 includes a worksheet 1110 for a selected party of interest including a party name, type, insurance carrier, contact information for the insurance carrier, an insurance policy number, and/or an insurance claim identifier. The display 1100 may also include risk transfer evaluation parameters 1120, including high and low values for total damages, risk transfer percentage, risk transfer offset, estimated damages (e.g., representing the damages amount multiplied by the risk transfer percentage), financials, indemnity, and expense costs. According to some embodiments, the display 1100 further includes multiple risk transfer lines 1130 including, for each risk transfer line, a date, status (e.g., none selected, requested, received, pursuit discontinued, pending, accepted, and rejected), estimated damage value, a risk transfer percentage, and comments as appropriate.

Figure 12:
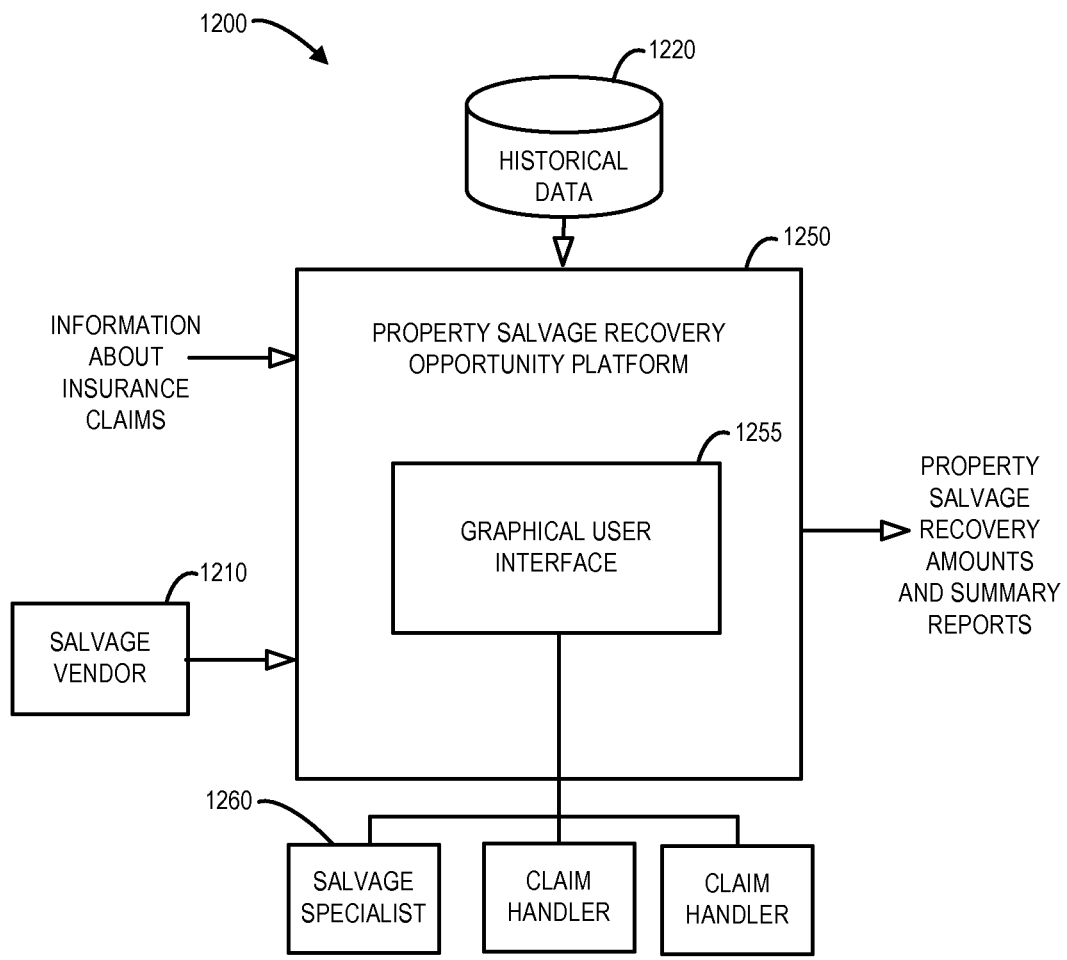
FIG. 12 is a block diagram of a property salvage recovery opportunity system in accordance with some embodiments.

Thus, embodiments may help a claim handler detect and/or process risk transfer recovery opportunities as appropriate. Note that other types of recovery opportunities may be also be supported according to some embodiments. For example, FIG. 12 is a block diagram of a property salvage recovery opportunity system 1200 in accordance with some embodiments. The property salvage recovery opportunity system 1200 includes a property salvage recovery opportunity platform 1250 which may be associated with the property salvage tool 158 described with respect to FIG. 1. According to some embodiments, the property salvage recovery opportunity platform 1250 automatically identifies potential property salvage recovery opportunities to salvage specialists and/or claim handlers 1260 and/or determines appropriate property salvage recovery amounts (e.g., based on information received from salvage specialists and claim handlers 1260 via a graphical user interface 1255 and/or a salvage vendor 1210) for insurance claims. The property salvage recovery amounts may also be used to create summary reports. According to some embodiments, historical data 1220 may be used to train a predictive model that automatically identifies potential property salvage recovery opportunities.

Figure 13:
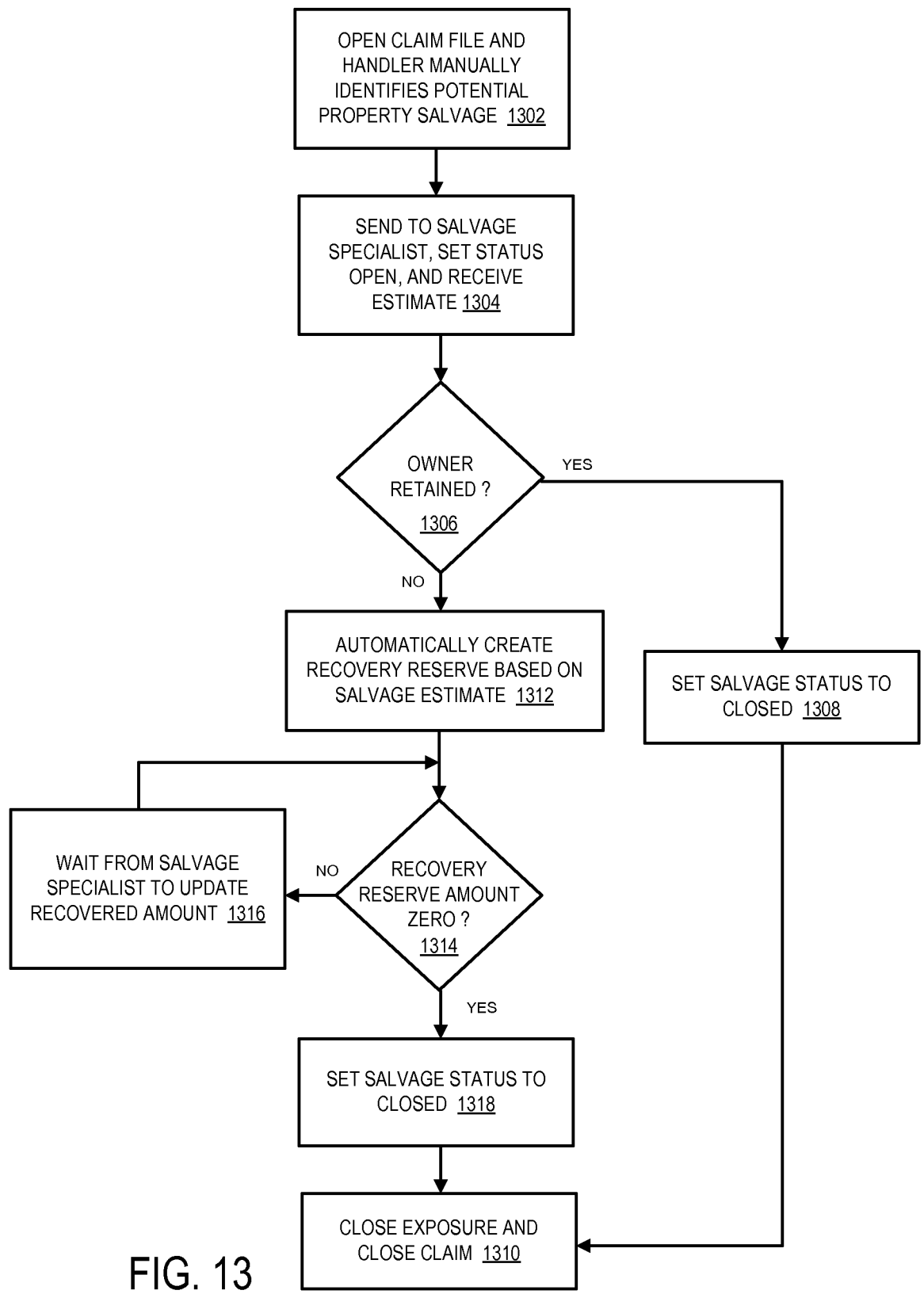
FIG. 13 is an example of a property salvage recovery opportunity method that might be performed according to some embodiments.

FIG. 13 is an example of a property salvage recovery opportunity method that might be performed according to some embodiments. Initially, a claim file may be opened and a claim handler may manually identify a potential salvage opportunity at 1302. At 1304, information about the claim may be sent to a salvage specialist, a salvage status may be set to "open," and a salvage estimate may be received. If the owner retains the property at 1306, the salvage status may be set to "closed" at 1308, and the exposure and claim may be closed at 1310.

If the owner does not retain the property at 1306, the system may automatically create a recovery reserve based on the salvage estimate at 1312. If the recovery reserve amount is not equal to zero at 1314, the system waits for the salvage specialist to update the recovered amount at 1316. When the recovery reserve amount is equal to zero at 1314, the system sets the salvage status to "closed" at 1318, and the exposure and claim may be closed at 1310.

FIG. 14 illustrates a property salvage recovery opportunity details display 1400 in accordance with some embodiments. In particular, the display 1400 includes a recovery category 1410 and payor name 1420 along with exposure details. The display may further include check information 1430, including a check number, a check amount, and a check date. Moreover, property salvage recovery details 1440 may include a reserve line description, a recovery reserve (e.g., a recovery reserve amount against the reserve line allocated), and a gross settlement (e.g., which may be totaled and used to automatically populate the check information 1430). In this way, the system may have the ability to receive the recovery against multiple exposures across reserve lines. The system may let the claim handler or salvage specialist choose one or more exposure to be used to post the recovery. According to some embodiments, reserve lines from the selected exposure for which the recovery reserve has been set up may be fetched. The system may display a unique reserve line even if there are multiple categories of items tagged to the same reserve line. The recovery reserve in the grid 1440 may be an aggregate of the estimates set in the salvage screen.

FIG. 15 illustrates a property salvage recovery loss details display 1500 in accordance with some embodiments. In particular, the display 1500 includes information about the loss 1510 including a description, a loss date, a loss cause, a fault rating, an indication of whether the loss was a result of a catastrophe, an indication of whether the loss was weather related, and an indication of whether there may be a salvage opportunity associated with the loss. The display 1500 may also include a list of items associated with the loss 1520, one or more types of damages 1530, and a location associated with the loss 1540.

FIG. 16 illustrates a salvage details display 1600 in accordance with some embodiments. In particular, the display 1600 includes general salvage details 1610 with filter criteria (to filter the salvage items based on the type of exposure available on the claim), salvage status, salvage specialist name, and date of referral. Moreover, one or more salvage categories 1620 may include a category description, a reserve line (showing the list of indemnity reserves available on the claim), a salvage item name, an estimated salvage amount (e.g., to be entered by a salvage specialist, such that for all of the salvage items under an exposure a single recovery reserve may be created with the amount being the total of all the estimated salvage amounts for all the salvage items within the exposure), a status, an indication of whether the item was retained by the owner, an actual salvage value, a total expense amount, and an overall recovered total value (e.g., the difference between the actual salvage and total expenses). According to some embodiments, the display may include salvage vendor details 1630, including a vendor name, a date of referral to the vendor, a date the item was received from the vendor, a sell date, a vendor commission amount, and an indication of other expenses.

According to some embodiments, the system may create an automatic recovery reserve against the reserve line. Moreover, the recovery reserve may be created based on the actual salvage value less expenses, and the system may determine when an amount changes and update the recovery reserve if there are any changes to the actual salvage or the total expenses fields. When a new category is added, the system may have the ability to create the recovery reserve only for the new salvage item. If the recovery reserve is already represented, the system may adjust the reserve accordingly for the existing entry and the new entry. If an existing category is removed, the system may reduce the recovery reserve by the actual salvage amount on that reserve line.

Figure 17:
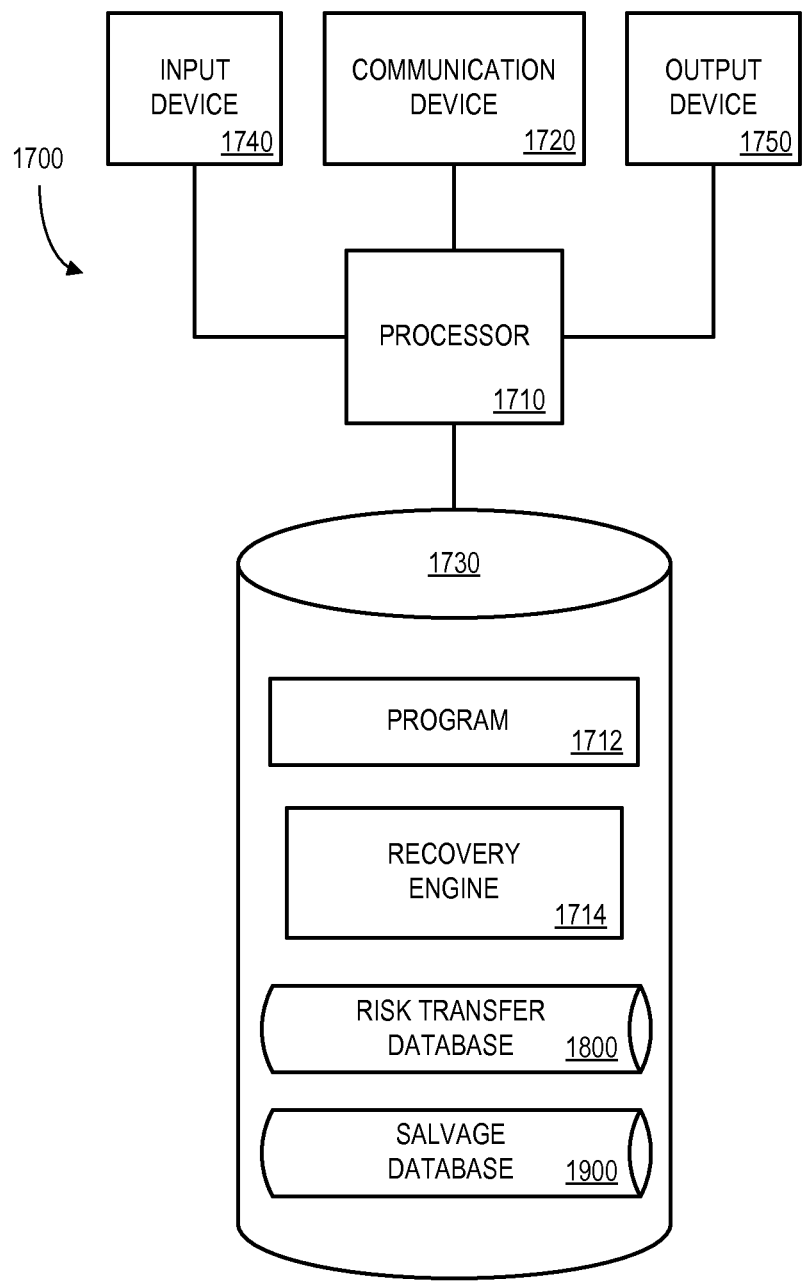
FIG. 17 is block diagram of a recovery opportunity tool or platform according to some embodiments of the present invention.

Note that the embodiments described herein may be implemented using any number of different hardware configurations. For example, FIG. 17 illustrates a recovery opportunity platform 1700 that may be, for example, associated with the systems 100, 400 of FIGS. 1 and 4. The recovery opportunity platform 1700 comprises a processor 1710, such as one or more commercially available Central Processing Units (CPUs) in the form of one-chip microprocessors, coupled to a communication device 1720 configured to communicate via a communication network (not shown in FIG. 17). The communication device 1720 may be used to communicate, for example, with one or more claim systems, remote team leaders, payment applications, salvage specialists, and/or claim handler devices. The recovery opportunity platform 1700 further includes an input device 1740 (e.g., a mouse and/or keyboard to enter information about risk transfer and/or salvage rules) and an output device 1750 (e.g., to output an indication of an appropriate recovery amount, a summary report, or a spreadsheet).

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 and/or a recovery engine 1714 for controlling the processor 1710. The processor 1710 performs instructions of the programs 1712, 1714, and thereby operates in accordance with any of the embodiments described herein. For example, the processor 1710 may receive data indicative of a plurality of insurance claims submitted in connection with insurance policies. The processor 1710 may then, based on the received data, identify an insurance claim as being associated with a potential recovery opportunity. For the identified insurance claim, the processor 1710 may automatically arrange for a potential recovery user interface to be displayed to a claim handler and may receive, via the potential recovery user interface, recovery details from the claim handler. A summary report may be automatically generated by the processor 1710 for a plurality of insurance claims based in part on the recovery details received from the claim handler, and an indication of the summary report may be transmitted.

The programs 1712, 1714 may be stored in a compressed, uncompiled and/or encrypted format. The programs 1712, 1714 may furthermore include other program elements, such as an operating system, a database management system, and/or device drivers used by the processor 1710 to interface with peripheral devices.

As used herein, information may be "received" by or "transmitted" to, for example: (i) the recovery opportunity platform 1700 from another device; or (ii) a software application or module within the recovery opportunity platform 1700 from another software application, module, or any other source.

In some embodiments (such as shown in FIG. 17), the storage device 1730 further stores a risk transfer database 1800 and a salvage database 1900. Examples of databases that may be used in connection with the recovery opportunity platform 1700 will now be described in detail with respect to FIGS. 18 and 19. Note that the databases described herein are only examples, and additional and/or different information may be stored therein. Moreover, various databases might be split or combined in accordance with any of the embodiments described herein. For example, the risk transfer database 1800 and/or the salvage database 1900 may be combined and stored within the recovery engine 1714.

Figure 18:
FIG. 18 is a tabular portion of a risk transfer database according to some embodiments.

Referring to FIG. 18, a table is shown that represents the risk transfer database 1800 that may be stored at the recovery opportunity platform 1700 according to some embodiments. The table may include, for example, entries identifying risk transfer opportunities being processed in accordance with some embodiments described herein. The table may also define fields 1802, 1804, 1806, 1808, 1810, 1812 for each of the entries. The fields 1802, 1804, 1806, 1808, 1810, 1812 may, according to some embodiments, specify: a risk transfer identifier 1802, a name 1804, a policy number 1806, a claim number 1808, a total damages amount 1810, and a risk transfer percent 1812. The risk transfer database 1800 may be created and updated, for example, based on insurance claim information electrically received on a periodic basis and/or information received from a claim handler.

The risk transfer identifier 1802 may be, for example, a unique alphanumeric code identifying another party that may be at least partly responsible for an insurance claim. The name 1804 may describe the party and the policy number 1806 and claim number 1808 may identify another insurance policy claim that may be applicable to the loss event. The total damages 1810 and the risk transfer percent 1812 may indicate the amount of a loss and/or the relative share of the party's responsibility for the loss.

Figure 19:
FIG. 19 is a tabular portion of a salvage database according to some embodiments.

Referring to FIG. 19, a table is shown that represents the salvage database 1900 that may be stored at the recovery opportunity platform 1700 according to some embodiments. The table may include, for example, entries identifying salvage opportunities being processed in accordance with some embodiments described herein. The table may also define fields 1902, 1904, 1906, 1908, 1910, 1912 for each of the entries. The fields 1902, 1904, 1906, 1908, 1910, 1912 may, according to some embodiments, specify: a salvage identifier 1902, a salvage specialist 1904, an indication of whether an owner retained an item 1906, an actual salvage value 1908, expense amounts 1910, and a status 1912. The risk transfer database 1900 may be created and updated, for example, based on insurance claim information electrically received on a periodic basis and/or information received from a salvage specialist and/or a claim handler.

The salvage identifier 1902 may be, for example, a unique alphanumeric code identifying an item that may be sold to recover at least some of the costs associated with an insurance claim. The salvage specialist 1904 may might comprise a name, identifier, or contact information associated with an insurer employee who has specialized knowledge about salvage opportunities. The indication of whether an owner retained an item 1906 may be used, for example, to determine if a salvage opportunity is even possible. The actual salvage value 1908 may represent a price at which the item was sold and the expense amounts 1910 might represent costs (e.g., a vendor commission) associated with the sale. The status 1912 might indicate, according to some embodiments, whether the salvage opportunity is pending or closed (e.g., the item has already been sold).

Thus, a recovery opportunity tool, platform, or engine may facilitate the processing of insurance claims. According to some embodiment, a predictive model may be used in connection with the identification and/or processing of recovery opportunities. As used herein, the phrase "predictive model" might refer to, for example, any of a class of algorithms that are used to understand relative factors contributing to an outcome, estimate unknown outcomes, discover trends, and/or make other estimations based on a data set of factors collected across prior trials. Note that a predictive model might refer to, but is not limited to, methods such as ordinary least squares regression, logistic regression, decision trees, neural networks, generalized linear models, and/or Bayesian models. The predictive model might be trained with historical claim transaction data, and be applied to current claim transactions to determine how the current claim transactions should be handled. Both the historical claim transaction data and data representing the current claim transactions might include, according to some embodiments, indeterminate data or information extracted therefrom. For example, such data/information may come from narrative and/or medical text notes associated with a claim file.

Figure 20:
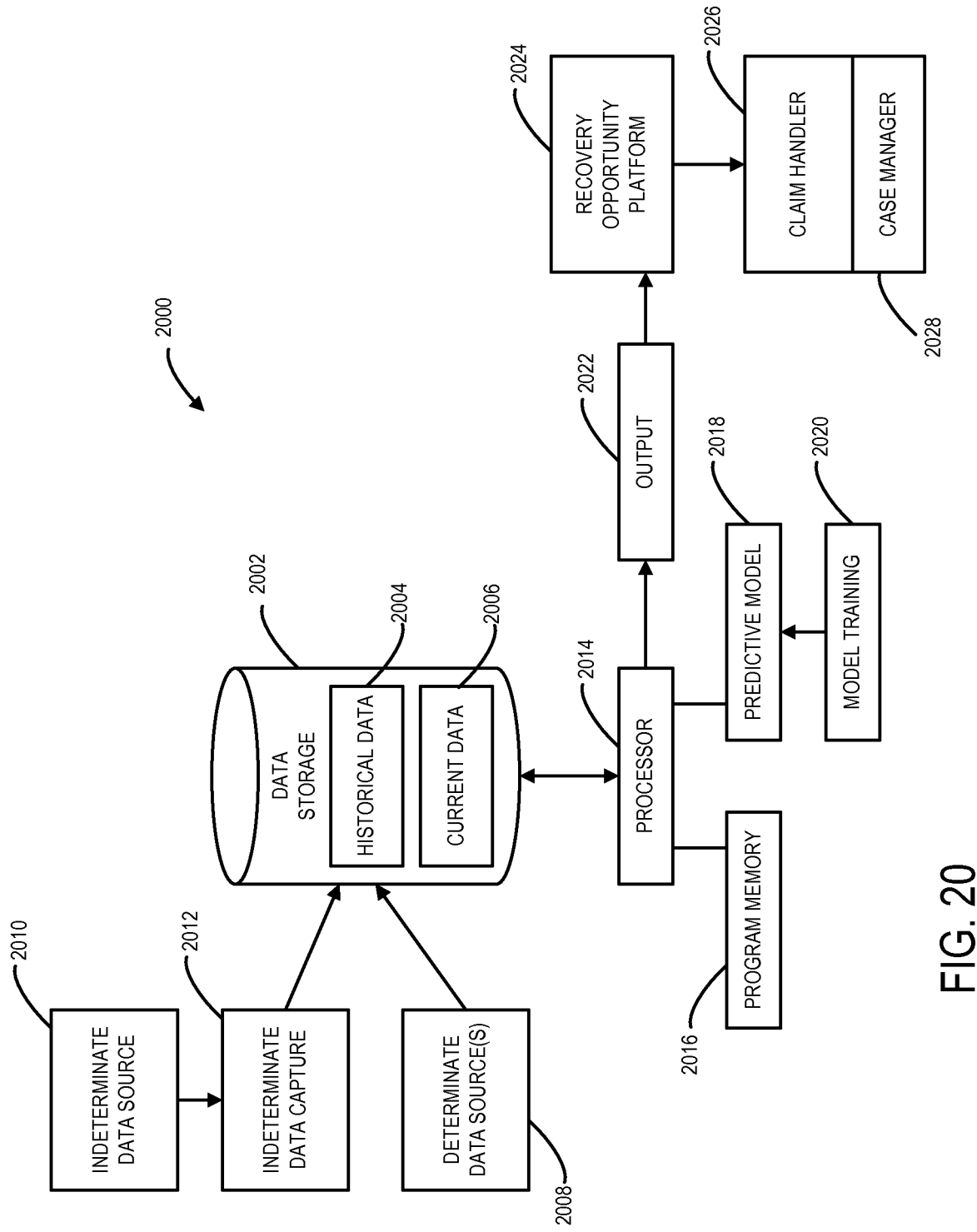
FIG. 20 is a partially functional block diagram that illustrates aspects of a computer system provided in accordance with some embodiments of the invention.

Features of some embodiments associated with a predictive model will now be described by first referring to FIG. 20. FIG. 20 is a partially functional block diagram that illustrates aspects of a computer system 2000 provided in accordance with some embodiments of the invention. For present purposes it will be assumed that the computer system 2000 is operated by an insurance company (not separately shown) for the purpose of referring certain claims to insurance claim workflows and/or handlers as appropriate.

The computer system 2000 includes a data storage module 2002. In terms of its hardware the data storage module 2002 may be conventional, and may be composed, for example, by one or more magnetic hard disk drives. A function performed by the data storage module 2002 in the computer system 2000 is to receive, store and provide access to both historical claim transaction data (reference numeral 2004) and current claim transaction data (reference numeral 2006). As described in more detail below, the historical claim transaction data 2004 is employed to train a predictive model to provide an output that indicates how a recovery opportunity may be identified and/or processed, and the current claim transaction data 2006 is thereafter analyzed by the predictive model. Moreover, as time goes by, and results become known from processing current claim transactions, at least some of the current claim transactions may be used to perform further training of the predictive model. Consequently, the predictive model may thereby adapt itself to changing claim patterns.

Either the historical claim transaction data 2004 or the current claim transaction data 2006 might include, according to some embodiments, determinate and indeterminate data. As used herein and in the appended claims, "determinate data" refers to verifiable facts such as the date of birth, age or name of a claimant or name of another individual or of a business or other entity; a type of injury, accident, sickness, or pregnancy status; a medical diagnosis; a date of loss, or date of report of claim, or policy date or other date; a time of day; a day of the week; a vehicle identification number, a geographic location; and a policy number.

As used herein and in the appended claims, "indeterminate data" refers to data or other information that is not in a predetermined format and/or location in a data record or data form. Examples of indeterminate data include narrative speech or text, information in descriptive notes fields and signal characteristics in audible voice data files. Indeterminate data extracted from medical notes or accident reports might be associated with, for example, an amount of loss and/or details about how an accident occurred.

The determinate data may come from one or more determinate data sources 2008 that are included in the computer system 2000 and are coupled to the data storage module 2002. The determinate data may include "hard" data like the claimant's name, date of birth, social security number, policy number, address; the date of loss; the date the claim was reported, etc. One possible source of the determinate data may be the insurance company's policy database (not separately indicated). Another possible source of determinate data may be from data entry by the insurance company's claims intake administrative personnel.

The indeterminate data may originate from one or more indeterminate data sources 2010, and may be extracted from raw files or the like by one or more indeterminate data capture modules 2012. Both the indeterminate data source(s) 2010 and the indeterminate data capture module(s) 2012 may be included in the computer system 2000 and coupled directly or indirectly to the data storage module 2002. Examples of the indeterminate data source(s) 2010 may include data storage facilities for document images, for text files (e.g., claim handlers' notes) and digitized recorded voice files (e.g., claimants' oral statements, witness interviews, claim handlers' oral notes, etc.). Examples of the indeterminate data capture module(s) 2012 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual. For example, claim handlers' opinions may be extracted from their narrative text file notes.

The computer system 2000 also may include a computer processor 2014. The computer processor 2014 may include one or more conventional microprocessors and may operate to execute programmed instructions to provide functionality as described herein. Among other functions, the computer processor 2014 may store and retrieve historical claim transaction data 2004 and current claim transaction data 2006 in and from the data storage module 2002. Thus the computer processor 2014 may be coupled to the data storage module 2002.

The computer system 2000 may further include a program memory 2016 that is coupled to the computer processor 2014. The program memory 2016 may include one or more fixed storage devices, such as one or more hard disk drives, and one or more volatile storage devices, such as RAM devices. The program memory 2016 may be at least partially integrated with the data storage module 2002. The program memory 2016 may store one or more application programs, an operating system, device drivers, etc., all of which may contain program instruction steps for execution by the computer processor 2014.

The computer system 2000 further includes a predictive model component 2018. In certain practical embodiments of the computer system 2000, the predictive model component 2018 may effectively be implemented via the computer processor 2014, one or more application programs stored in the program memory 2016, and data stored as a result of training operations based on the historical claim transaction data 2004 (and possibly also data resulting from training with current claims that have been processed). In some embodiments, data arising from model training may be stored in the data storage module 2002, or in a separate data store (not separately shown). A function of the predictive model component 2018 may be to identify and/or process recovery opportunities for insurance claims. The predictive model component may be directly or indirectly coupled to the data storage module 2002.

The predictive model component 2018 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 2000 includes a model training component 2020. The model training component 2020 may be coupled to the computer processor 2014 (directly or indirectly) and may have the function of training the predictive model component 2018 based on the historical claim transaction data 2004. (As will be understood from previous discussion, the model training component 2020 may further train the predictive model component 2018 as further relevant claim transaction data becomes available.) The model training component 2020 may be embodied at least in part by the computer processor 2014 and one or more application programs stored in the program memory 2016. Thus the training of the predictive model component 2018 by the model training component 2020 may occur in accordance with program instructions stored in the program memory 2016 and executed by the computer processor 2014.

In addition, the computer system 2000 may include an output device 2022. The output device 2022 may be coupled to the computer processor 2014. A function of the output device 2022 may be to provide an output that is indicative of (as determined by the trained predictive model component 2018) particular recovery opportunity data for the current claim transactions. The output may be generated by the computer processor 2014 in accordance with program instructions stored in the program memory 2016 and executed by the computer processor 2014. More specifically, the output may be generated by the computer processor 2014 in response to applying the data for the current claim transaction to the trained predictive model component 2018. The output may, for example, be a true/false flag or a number within a predetermined range of numbers. In some embodiments, the output device may be implemented by a suitable program or program module executed by the computer processor 2014 in response to operation of the predictive model component 2018.

Still further, the computer system 2000 may include a recovery opportunity platform module 2024. The recovery opportunity platform module 2024 may be implemented in some embodiments by a software module executed by the computer processor 2014. The recovery opportunity platform module 2024 may have the function of directing workflow based on the output from the output device. Thus, the recovery opportunity platform module 2024 may be coupled, at least functionally, to the output device 2022. In some embodiments, for example, the recovery opportunity platform module 2024 may direct workflow by referring, to a claim handler 2026, current claim transactions analyzed by the predictive model component 2018 and found to be associated with one or more recovery opportunities. In some embodiments, these current claim transactions may be referred to case manager 2028 who is associated with the claim handler 2026. The claim handler 2026 may be a part of the insurance company that operates the computer system 2000, and the case manager 2028 might be an employee of the insurance company.

Figure 21:
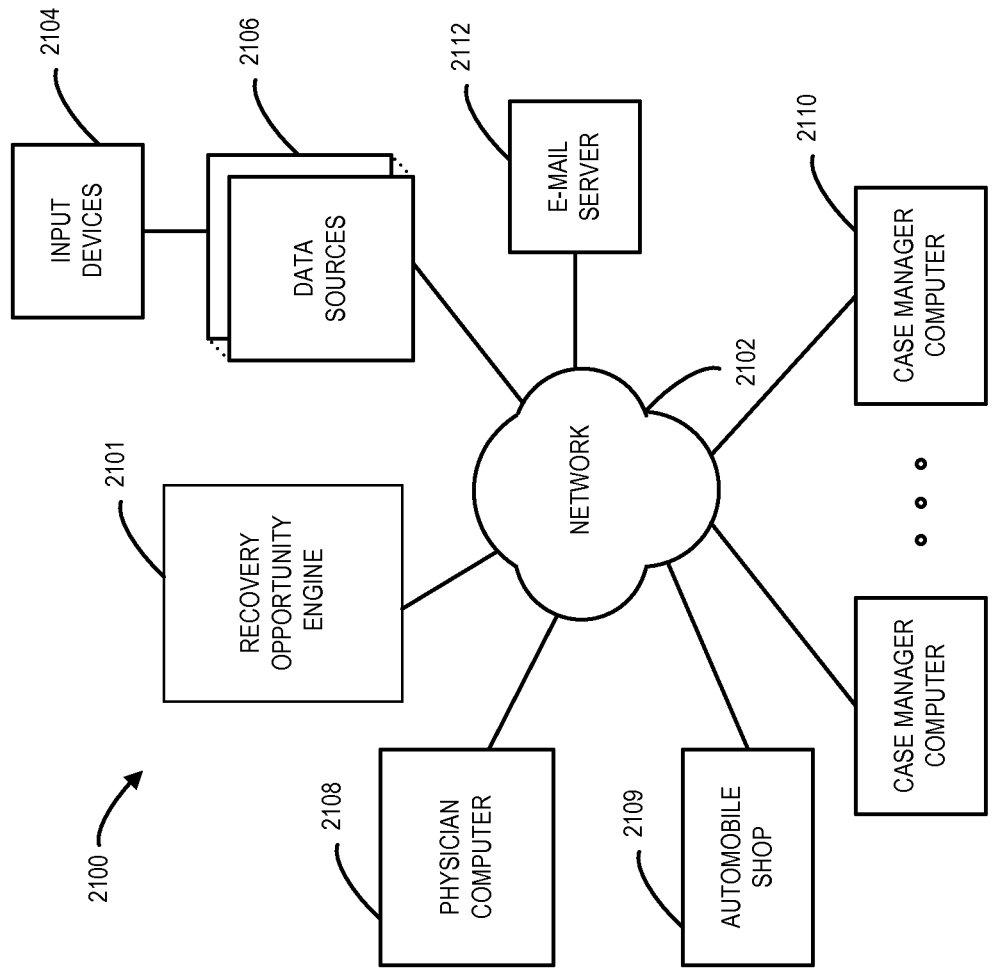
FIG. 21 is a block diagram that provides another representation of aspects of the system of FIG. 20.

FIG. 21 is another block diagram that presents a computer system 2100 in a somewhat more expansive or comprehensive fashion (and/or in a more hardware-oriented fashion). The computer system 2100, as depicted in FIG. 21, includes a "recovery opportunity engine" 2101 to automatically and selectively assess newly received insurance claims for the insurance company. As seen from FIG. 21, the computer system 2100 may further include a conventional data communication network 2102 to which the recovery opportunity engine 2101 is coupled.

FIG. 21 also shows, as parts of computer system 2100, data input device(s) 2104 and data source(s) 2106, the latter (and possibly also the former) being coupled to the data communication network 2102. The data input device(s) 2104 and the data source(s) 2106 may collectively include the devices 2008, 2010 and 2012 discussed above with reference to FIG. 20. More generally, the data input device (s) 2104 and the data source(s) 2106 may encompass any and all devices conventionally used, or hereafter proposed for use, in gathering, inputting, receiving and/or storing information for insurance company claim files.

Still further, FIG. 21 shows, as parts of the computer system 2100, personal computer 2108 assigned for use by one or more physicians (who may be associated with the insurance company's long term disability insurance program), automobile shop computer 2109 (e.g., to transmit repair estimates), and personal computers 2110 assigned for use by case managers (who might also be associated with team leaders, salvage specialists, and/or claim handlers). The personal computers 2108, 2109, 2110 may be coupled to the data communication network 2102.

Also included in the computer system 2100, and coupled to the data communication network 2102, is an electronic mail server computer 2112. The electronic mail server computer 2112 provides a capability for electronic mail messages to be exchanged among the other devices coupled to the data communication network 2102. Thus the electronic mail server computer 2112 may be part of an electronic mail system included in the computer system 2100. The computer system 2100 may also be considered to include further personal computers (not shown), including, e.g., computers which are assigned to individual claim handlers or other employees of the insurance company.

Figure 22:
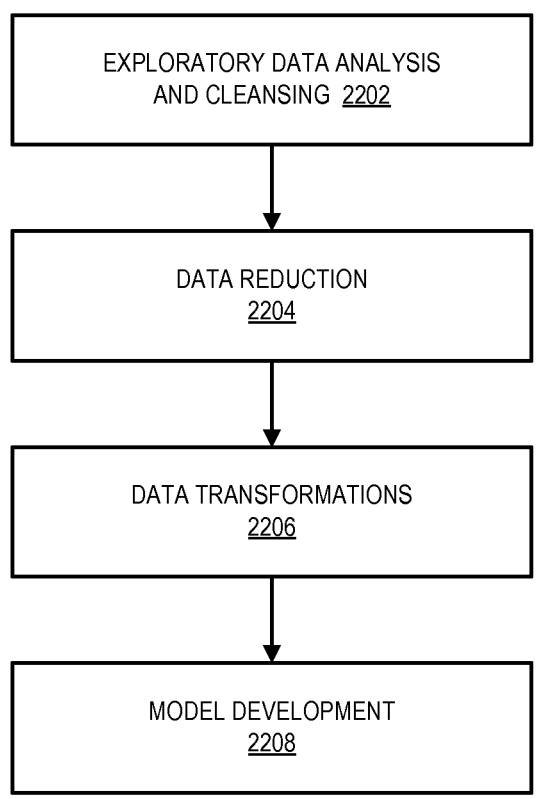
FIG. 22 is a flow chart illustrating how a predictive model might be trained according to some embodiments.

According to some embodiments, the recovery opportunity engine 2101 uses a predictive model to facilitate the identification and/or processing of risk transfers, salvages, etc. Note that the predictive model might be designed and/or trained in a number of different ways. For example, FIG. 22 is a flow chart illustrating how a predictive model might be created according to some embodiments. At 2202, data to be input to the predictive model may be analyzed, scrubbed, and/or cleaned. This process might involve a broad review of the relevant variables that may be included in the sample data. Variables might be examined for the presence of erroneous values, such as incorrect data types or values that don't make sense. Observations with such "noisy" data or missing data may be removed from the sample. Similarly, any data points that represent outliers may also be managed.

At 2204, a data reduction process might be performed. This might occur, for example, between variables in the data sample and/or within specific variables. According to some embodiments, certain variables may be associated with one another and the number of these variables may be reduced. For example, it might be noted that slip and fall insurance claims are frequently associated with recovery opportunities. Within certain variables, the raw values may represent a level of information that is too granular. These raw values might then be categorized to reduce the granularity. A goal of the data reduction process may be to reduce the dimensionality of the data by extracting factors or clusters that may account for the variability in the data.

At 2206, any necessary data transformations may be performed. Transformations of dependent and/or independent variables in statistical models can be useful for improving interpretability, model fit, and/or adherence to modeling assumptions. Some common methods may include normalizations of variables to reduce the potential effects of scale and dummy coding or other numeric transformations of character variables.

Once these steps are complete, the predictive model may be developed at 2208. Depending on the nature of the desired prediction, various modeling techniques may be utilized and compared. The list of independent variables may be narrowed down using statistical methods as well as business judgment. Lastly, the model coefficients and/or weights may be calculated and the model algorithm may be completed. For example, it might be determined that certain types of property claims are more likely to have salvage opportunities (and thus, according to some embodiments, those types of claims may be more likely to be flagged by the predictive model).

Figure 23:
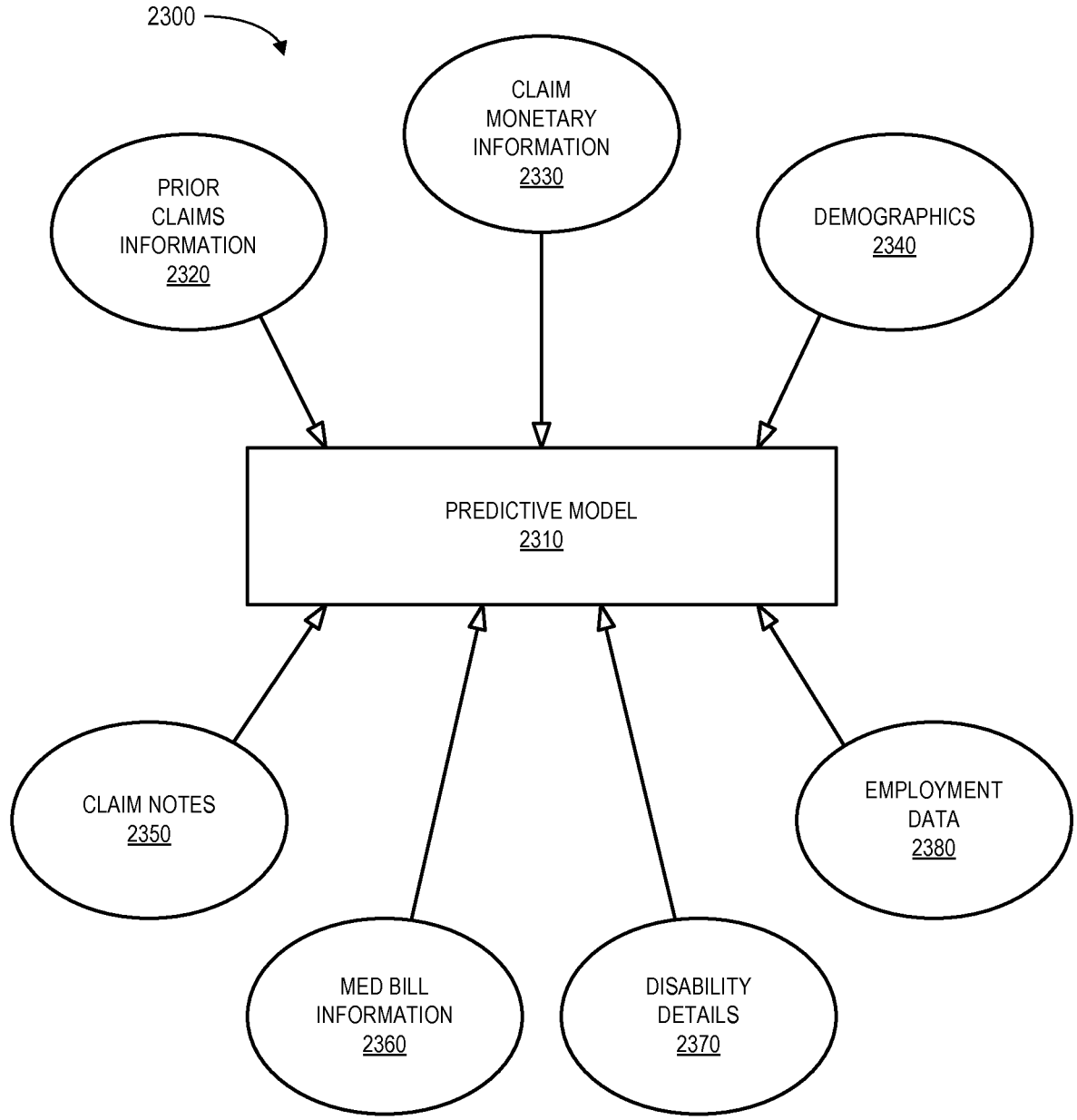
FIG. 23 illustrates predictive model inputs according to some embodiments.

Note that many different types of data might be used to create, evaluate, and/or use a predictive model. For example, FIG. 23 is a block diagram of a system 2300 illustrating inputs to a predictive model 2310 according to some embodiments. In this example, the predictive model 2310 might receive information about prior insurance claims 2320 (e.g., historical data). Moreover, the predictive model 2310 might receive monetary information about claims 2330 (e.g., a total amount of payments made in connection with a claim) and/or demographic information 2340 (e.g., the age or sex of a claimant). According to some embodiments, claim notes 2350 are input to the predictive model 2310 (e.g., and keywords may be extracted from the notes 2350). Other types of information that might be provided to the predictive model 2310 include medical bill information 2360 (e.g., including information about medical care that was provided to a claimant), disability details 2370 (e.g., which part or parts of the body have been injured), and employment data 2380 (e.g., an employee's salary or how long an employee has worked for an employer).

The predictive model 2310, in various implementations, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior data and outcomes known to the insurance company. The specific data and outcomes analyzed vary depending on the desired functionality of the particular predictive model 2310. The particular data parameters selected for analysis in the training process may be determined by using regression analysis and/or other statistical techniques known in the art for identifying relevant variables in multivariable systems. The parameters may be selected from any of the structured data parameters stored in the present system, whether the parameters were input into the system originally in a structured format or whether they were extracted from previously unstructured text.

Applicants have discovered that embodiments described herein may be particularly useful in connection with the types of insurance policies described herein. Note, however, that other types of insurance may also be associated with embodiments described herein. Moreover, the displays illustrated with respect to the present FIGS. are only provided as examples, and embodiments may be associated with any other types of user interfaces. For example, FIG. 24 illustrates a tablet computer 2400 according to some embodiments. In particular, the tablet computer 2400 is displaying a recovery opportunity display, including an indication of whether there may be other parties potentially liable for the loss 2410, similar to the display 600 described with respect to FIG. 6.

Note that the present invention provides significant technical improvements to facilitate the detection and/or processing of recovery opportunities. The present invention is directed to more than merely a computer implementation of a routine or conventional activity previously known in the industry as it significantly advances the technical efficiency, access and/or accuracy of recovery opportunity detection and/or processing by implementing a specific new method and system as defined herein. The present invention is a specific advancement in the area of recovery opportunity detection and/or processing by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, in the present invention tens of thousands insurance claims may be analyzed and recovery opportunities may be accurately and automatically detected and/or processed.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system, comprising:

a communication device to receive data indicative of a plurality of insurance claims submitted in connection with insurance policies, the received data including determinate data and indeterminate data;

a computer storage unit for receiving, storing, and providing said data indicative of the plurality of insurance claims;

a risk transfer opportunity platform processor in communication with the storage unit, wherein the processor is configured for:

based on the received determinate and indeterminate data, determining, employing a computerized predictive model trained on historical claim data including at least monetary information, demographic information, medical bill information, and claim notes, and prior risk transfer results, and further trained subsequently on current claim data and risk transfer results, whether, for a plurality of the insurance claims, there is another party potentially responsible for the insurance claim, the claims for which there is another party potentially responsible for the claim being identified as being associated with a potential risk transfer opportunity, and a likelihood of salvage recovery opportunities, wherein the historical claim data is scrubbed of erroneous values and subjected to data reduction to reduce variables associated with one another, categorizing of raw values to reduce granularity, and data transformations to improve interpretability, model fit or adherence to modeling assumptions prior to training the computerized predictive model;

responsive to the determination, proceeding to one of (a) or (b):

(a) for the insurance claims for which another party is determined to be potentially responsible, automatically arranging for a potential risk transfer user interface to be displayed to a claim handler, the potential risk transfer interface including fields for entry of data regarding at least a name of a potentially responsible party, a type of association with the claim of the potentially responsible party, and a liability percentage, receiving, via the potential risk transfer user interface, recovery details from the claim handler, including an overall total damages value and a risk transfer value, automatically generate in the potential risk transfer user interface a pop-up window that displays a set of planned activities including a review of risk transfer activity having a due date, priority, and assigned claim handler, automatically generating a summary report associated with a plurality of insurance claims based in part on the overall total damages value and risk transfer value received from the claim handler, and transmitting an indication of the summary report;

(b) for the insurance claims for which no other party is determined to be responsible, identify the claims for normal insurance claim processing, without automatically arranging for a potential risk transfer user interface to be displayed to a claim handler; and a property salvage recovery opportunity platform processor configured to automatically communicate potential salvage recovery opportunities identified by the computerized predictive model to salvage specialists and determine property salvage recovery amounts based on information received from salvage specialists via a graphical user interface.

2. The system of claim 1, wherein the risk transfer opportunity platform processor is further configured for: arranging to track recovery payments received for the insurance claims for which another party is determined to be potentially responsible.

3. The system of claim 1, wherein the system is adapted to process insurance claims associated with any of: (i) automobile insurance, (ii) homeowners insurance, (iii) property insurance, (iv) general liability insurance, (v) commercial insurance, (vi) personal insurance, and (vii) workers' compensation insurance.

4. The system of claim 1, wherein the risk transfer opportunity platform processor is further configured for: automatically transmitting an indication of a recovery amount to at least one of: (i) an email server, (ii) a workflow application, (iii) a report generator, (iv) a calendar application, and (v) a payment facilitation device.

5. The system of claim 1, wherein the determining whether there is another party potentially responsible for the insurance claim is based at least in part on rules associated with transitions between subrogation statuses and a type of insurance associated with the insurance claim.

6. The system of claim 1, wherein the overall total damages value includes a low and a high estimate and the risk transfer value includes a low and a high estimate.

7. The system of claim 6, wherein the risk transfer opportunity platform processor stores, for each risk transfer recovery opportunity, at least one of: (i) a responsible party, (ii) a role, (iii) a liability amount, (iv) a risk transfer type, (v) other coverage data, and (vii) related information.

8. The system of claim 6, wherein the risk transfer opportunity platform processor stores, for each risk transfer opportunity, a risk transfer strategy.

9. The system of claim 8, wherein the risk transfer strategy is associated with a plurality of planned activities, each including: (i) a date due, (ii) a priority, (iii) a subject, and (iv) an assigned party to perform the planned activity.

10. The system of claim 6, wherein the risk transfer opportunity platform processor stores, for each risk transfer opportunity, at least one of: (i) a responsible party name, (ii) a carrier, (iii) contact information, (iv) an insurance policy identifier, and (v) a claim identifier.

11. The system of claim 6, wherein the risk transfer opportunity platform processor stores, for each risk transfer recovery opportunity, at least one of: (i) a recovery monetary value, and (ii) a recovery percentage.

12. The system of claim 1, wherein the property salvage recovery opportunity platform processor stores, for each property salvage recovery opportunity, at least one of: (i) a salvage status, (ii) a salvage specialist identifier, (iii) a date of referral, (iv) a category, (vi) a salvage item, (vii) an estimate salvage amount, (viii) an owner retained indication, (ix) an amount paid for property, (x) an actual salvage value, (xi) an expense total, and (xii) a recovered total value.

13. The system of claim 1, wherein the property salvage recovery opportunity platform processor is further configured to automatically adjust a recovery reserve amount.

14. The system of claim 1, wherein said automatic identification of the insurance claim as being associated with a potential recovery opportunity is based on rules and data received from the claim handler.

15. The system of claim 1, wherein said automatic identification of the insurance claim as being associated with a potential recovery opportunity is associated with a predictive model trained with historical insurance claim information.

16. The system of claim 15, wherein the predictive model is associated with at least one of: (i) a neural network, (ii) a Bayesian network, (iii) a Hidden Markov model, (iv) an expert system, (v) a decision tree, (vii) a collection of decision trees, (viii) a support vector machine, and (ix) weighted factors.

17. A computer-implemented method, comprising:
receiving, by a communication device, data indicative of a plurality of insurance claims submitted in connection with insurance policies, the received data including determinate data and indeterminate data;
storing, by a computer storage unit, said data indicative of the plurality of insurance claims;
based on the received determinate and indeterminate data, automatically determining by a risk transfer opportunity platform processor employing a computerized predictive model trained on historical claim data including at least monetary information, demographic information, medical bill information, and claim notes, and prior risk transfer results, and further trained subsequently on current claim data and risk transfer results, whether, for a plurality of the insurance claims, there is another party potentially responsible for the insurance claim, the claims for which there is another party potentially responsible for the claim being identified as being associated with a potential risk transfer opportunity, and a likelihood of salvage recovery opportunities, wherein the historical claim data is scrubbed of erroneous values and subjected to data reduction to reduce variables associated with one another, categorizing of raw values to reduce granularity, and data transformations to improve interpretability, model fit or adherence to modeling assumptions prior to training the computerized predictive model;
responsive to the determination, proceeding to one of (a) or (b):
(a) for the insurance claims identified as being associated with a potential risk transfer opportunity, automatically arranging by the risk transfer opportunity platform processor for a potential risk transfer user interface to be displayed to a claim handler, the potential risk transfer interface including fields for entry of data regarding at least a name of a potentially responsible party, a type of association with the claim of the potentially responsible party, and a liability percentage,
receiving, via the potential risk transfer user interface by the recovery opportunity platform processor, recovery details from the claim handler, including an overall total damages value and a risk transfer value,
automatically generating by the risk transfer opportunity processor in the potential risk transfer user interface a pop-up window that displays a set of planned activities including a review of risk transfer activity having a due date, priority, and assigned claim handler, and
automatically generating by the risk transfer opportunity platform processor a summary report associated with a plurality of insurance claims based in part on the overall total damages value and the risk transfer value received from the claim handler,
transmitting an indication of the summary report;
(b) for the insurance claims for which no other party is determined to be responsible, identifying, by the risk transfer opportunity platform processor, the claims for normal insurance claim processing, without automatically arranging for a potential risk transfer user interface to be displayed to a claim handler;
receiving, by a property salvage recovery opportunity platform processor, data indicative of at least one of the insurance claims, automatically communicating, by the property salvage recovery opportunity platform processor, potential salvage recovery opportunities identified by the computerized predictive model to salvage specialists and determining, by the property salvage recovery opportunity platform processor, property salvage recovery amounts based on information received from salvage specialists via a graphical user interface.

18. The method of claim 17, wherein said automatic determination of whether there is another party potentially responsible for the insurance claim is based on rules and data received from the claim handler.

19. The method of claim 17, wherein said automatic identification of the insurance claim as being associated with a potential risk transfer opportunity is associated with a predictive model trained with historical insurance claim information.

20. A system for insurance claim processing, comprising:
a communication device to receive data indicative of a plurality of insurance claims submitted in connection with insurance policies;
a computer storage unit for receiving, storing, and providing said data indicative of the plurality of insurance claims;
a risk transfer opportunity platform processor in communication with the storage unit, wherein the processor is configured for:
based on the received data, the received data including determinate and indeterminate data, determining, employing a computerized predictive model trained on historical claim data including at least monetary information, demographic information, medical bill information, and claim notes, and prior risk transfer results, and further trained subsequently on current claim data and risk transfer results, whether, for a first insurance claim, there is another party potentially responsible for the insurance claim, and, responsive to determining that there is another party potentially responsible for the first insurance claim, identifying the first insurance claim as being associated with a potential risk transfer recovery opportunity, and a likelihood of salvage recovery opportunities, wherein the historical claim data is scrubbed of erroneous values and subjected to data reduction to reduce variables associated with one another, categorizing of raw values to reduce granularity, and data transformations to improve interpretability, model fit or adherence to modeling assumptions prior to training the computerized predictive model;
responsive to the determination, proceeding to one of (a) or (b):
(a) for the identified first insurance claim, arranging for a potential risk transfer recovery user interface to be displayed to a claim handler, the potential risk transfer interface including fields for entry of data regarding at least a name of a potentially responsible party, a type of association with the claim of the potentially responsible party, and a liability percentage,
receiving, via the potential recovery user interface, risk transfer recovery details from the claim handler, including a range of overall total damage values defined by high and low overall total damage values and a range of risk transfer values defined by high and low risk transfer values,
automatically generate in the potential risk transfer user interface a pop-up window that displays a set of planned activities including a review of risk transfer activity relating to the identified first insurance claim having a due date, priority, and assigned claim handler, based on the received data, identifying a second insurance claim as being associated with a potential property salvage recovery opportunity, for the identified second insurance claim, arranging for a potential property salvage recovery user interface to be displayed to the claim handler, receiving, via the potential property salvage recovery user interface, property salvage recovery details from the claim handler, and transmitting indications the first and second insurance claims;

(b) for a third insurance claim, determining that no other party is responsible, and identifying the third insurance claim for normal insurance claim processing, without automatically arranging for a potential risk transfer user interface to be displayed to a claim handler; and a property salvage recovery opportunity platform processor configured to automatically communicate potential salvage recovery opportunities identified by the computerized predictive model to salvage specialists and determine property salvage recovery amounts based on information received from salvage specialists via a graphical user interface.

21. The system of claim 20, wherein the recovery opportunity platform processor is further configured for:

automatically generating a risk transfer summary report associated with a plurality of insurance claims based in part on the high and low overall total damage values and the high and low risk transfer values received from the claim handler, and automatically generating a salvage summary report associated with a plurality of insurance claims based in part on the property salvage recovery details received from the claim handler, and transmitting indications of the risk transfer and salvage summary reports.

* * * * *